United States Patent
Hayashi et al.

(10) Patent No.: US 8,580,906 B2
(45) Date of Patent: Nov. 12, 2013

(54) POLYROTAXANE, AQUEOUS POLYROTAXANE DISPERSION COMPOSITION, CROSSLINKED BODY OF POLYROTAXANE AND POLYMER AND METHOD FOR PRODUCING THE SAME

(75) Inventors: Yuki Hayashi, Kashiwa (JP); Mariko Shibuya, Kashiwa (JP); Masabumi Kudoh, Matsudo (JP); Masahiko Yamanaka, Kashiwa (JP)

(73) Assignee: Advanced Softmaterials Inc., Kashiwa-shi (JP)

( * ) Notice: Subject to any disclaimer, the term of this patent is extended or adjusted under 35 U.S.C. 154(b) by 243 days.

(21) Appl. No.: 12/995,438

(22) PCT Filed: May 15, 2009

(86) PCT No.: PCT/JP2009/059041
§ 371 (c)(1),
(2), (4) Date: Nov. 30, 2010

(87) PCT Pub. No.: WO2009/145073
PCT Pub. Date: Dec. 3, 2009

(65) Prior Publication Data
US 2011/0118376 A1   May 19, 2011

(30) Foreign Application Priority Data
May 30, 2008   (JP) .................. 2008-142428

(51) Int. Cl.
*C08F 251/02* (2006.01)
*C08F 251/00* (2006.01)
*C08F 2/46* (2006.01)
*C08J 3/28* (2006.01)

(52) U.S. Cl.
USPC .......... 527/300; 525/54.2; 525/415; 525/420; 522/88; 522/110; 522/111; 522/178; 522/181; 522/182; 522/183

(58) Field of Classification Search
USPC ............ 522/88, 110, 111; 527/300; 525/54.2, 525/415, 420
See application file for complete search history.

(56) References Cited

U.S. PATENT DOCUMENTS

| | | | |
|---|---|---|---|
| 5,019,482 A | 5/1991 | Ai et al. | |
| 7,981,943 B2 * | 7/2011 | Ito et al. ...................... | 522/88 |
| 2004/0170924 A1 | 9/2004 | Kunimoto | |
| 2008/0096115 A1 | 4/2008 | Tanabe et al. | |
| 2010/0086881 A1 | 4/2010 | Matsumoto | |
| 2010/0136467 A1 | 6/2010 | Matsumoto | |
| 2010/0136491 A1 | 6/2010 | Matsumoto et al. | |

FOREIGN PATENT DOCUMENTS

| WO | 02/100903 A | 12/2002 |
|---|---|---|
| WO | 2006/018405 A | 2/2006 |

(Continued)

OTHER PUBLICATIONS

Copending U.S. Appl. No. 12/995,699, filed Dec. 2, 2010.

(Continued)

*Primary Examiner* — Sanza McClendon
(74) *Attorney, Agent, or Firm* — Christensen O'Connor Johnson Kindness PLLC

(57) ABSTRACT

Provided are a polyrotaxane capable of using an aqueous solvent in a fabricating process although it has hydrophobicity, an aqueous composition having the polyrotaxane, a crosslinked body comprising the polyrotaxane, etc. The polyrotaxane comprises blocking groups located at both ends of a pseudo-polyrotaxane having cyclic molecules and a linear molecule which pierces the cavities of the cyclic molecules in a skewered manner to form a clathrate therewith so as not to detach the cyclic molecules, wherein the cyclic molecules have a group represented by Formula I, a group represented by Formula II and a group represented by Formula III. Incidentally, M represents, for example, a group derived from ring-opening polymerization of $\epsilon$-caprolactone or the like, A represents a hydroxy group or the like, B represents a —COOH group or the like, and C represents A and/or B:

-M-A                Formula I;
-M-B                Formula II; and
—C                  Formula III.

27 Claims, 1 Drawing Sheet

(56) References Cited

FOREIGN PATENT DOCUMENTS

WO   2009/019173 A1   2/2009
WO   2009/147033 A1   12/2009

OTHER PUBLICATIONS

Extended European Search Report mailed May 4, 2012, issued in corresponding European Patent Application No. EP 09 75 4581.8, filed May 15, 2009, 8 pages.

Karino, T., et al., "Sol-Gel Transition of Hydrophobically Modified Polyrotaxane," Macromolecules 39(26):9435-9440, Dec. 2006.

Okumura, Y., and K. Ito, "The Polyrotaxane Gel: A Topological Gel by Figure-of-Eight Cross-Links," Advanced Materials 13(7):485-487, Apr. 2001.

Ooya, T., et al., "Preparation of α-Cyclodextrin-Terminated Polyrotaxane Consisting of β-Cyclodextrins and Pluronic as a Building Block of a Biodegradable Network," Macromolecular Bioscience 5(5):379-383, May 2005.

* cited by examiner

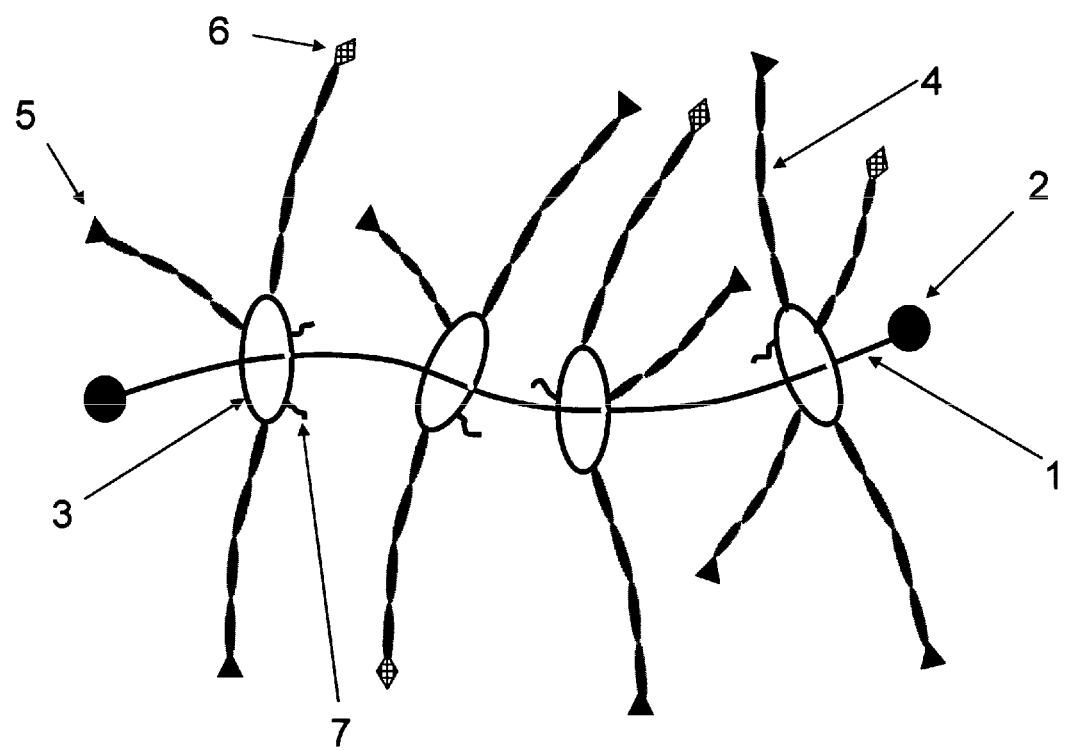

POLYROTAXANE, AQUEOUS POLYROTAXANE DISPERSION COMPOSITION, CROSSLINKED BODY OF POLYROTAXANE AND POLYMER AND METHOD FOR PRODUCING THE SAME

TECHNICAL FIELD

The present invention relates to a polyrotaxane having three specific groups, an aqueous polyrotaxane dispersion composition obtained by using the polyrotaxane, and a material comprising a crosslinked body of the polyrotaxane and a polymer, as well as a method of producing the polyrotaxane, a method of producing the composition, a method of producing the crosslinked body and a method of producing the material.

BACKGROUND ART

A polyrotaxane, which is comprised of a pseudopolyrotaxane, which comprises a linear molecule and cyclic molecules in which the linear molecule is included in cavities of the cyclic molecules in a skewered manner, and capping groups, each of which locates at each end of the pseudopolyrotaxane in order to prevent the dissociation of the cyclic molecules, has characteristics originating from the relative movement of the cyclic molecule(s) along the linear molecule, and is therefore expected to be useful in various applications.

For example, Patent Document 1 provides a polyrotaxane which uses α-cyclodextrins as the cyclic molecule(s) and has a part or all of the hydroxyl groups of the α-cyclodextrins modified with a hydrophobic modifying group. Specifically, Patent Document 1 discloses in the Examples the use of polycaprolactone as the hydrophobic modifying group.

Further, Patent Document 2 discloses a crosslinked polyrotaxane having its solubility in water improved by modifying the hydroxyl groups of α-cyclodextrins as the cyclic molecule(s) with a nonionic group.

More, Patent Document 3 discloses a polyrotaxane-containing wax for coating maintenance, and specifically, the patent document discloses the use of an oleophilic polyrotaxane as a solvent-based coating material and a hydrophilic polyrotaxane as an aqueous coating material. More specifically, Patent Document 3 discloses in the Examples that a product obtained by reacting a stearic acid-modified polyethylene glycol with hexamethylene diisocyanate to obtain a stearic acid-modified polyethylene glycol having isocyanate terminal groups, and reacting this stearic acid-modified polyethylene glycol with the hydroxyl group of α-cyclodextrin which serves as the cyclic molecule of a polyrotaxane, is used as an additive for a wax for coating maintenance.

On the other hand, organic solvents are replacing aqueous solvents for a variety of functional materials, from the viewpoints of reduced burden to the global environment, safety, hygiene and the like. Here, polyrotaxanes, which are expected to be useful in various applications as described above, are also requested to be soluble in water and/or organic solvents, and thus such polyrotaxanes have already been developed as disclosed in Patent Document 2 and the like.

Patent Document 1: WO 2007/026578.
Patent Document 2: WO 2005/080469.
Patent Document 3: WO 2007/106866.

DISCLOSURE OF THE INVENTION

Problems to be Solved by the Invention

While a hydrophobic polyrotaxane is preferably used as a material of, for example, coatings for household products, electrical appliances and metal surfaces; paints for automobiles and automobile parts; and adhesives and glues for electrical appliances and machine parts, a polyrotaxane with which an aqueous solvent can be used in its manufacturing process, is also necessary to develop. However, such a polyrotaxane has not yet been developed.

In particular, a polyrotaxane comprising a cyclic molecule(s) that has a relatively long-chained hydrophobic modifying group, which polyrotaxane can be partially provided with a hydrophilic group and can thereby be satisfactorily dispersed in an aqueous solvent, has not yet been developed.

An object of the present invention is to provide a polyrotaxane, which is hydrophobic and which can use an aqueous solvent in its manufacturing process.

Further, other than or in addition to the above object, an object of the present invention is to provide a polyrotaxane comprising a cyclic molecule(s), wherein the cyclic molecule has a relatively long hydrophobic modified group, and wherein the cyclic molecule partially has a hydrophilic group, thereby to disperse the polyrotaxane in an aqueous solvent satisfactorily.

More, other than or in addition to the above objects, an object of the present invention is to provide an aqueous dispersion composition comprising the above-described polyrotaxane.

Further, other than or in addition to the above object, an object of the present invention is to provide a material comprising the above-described polyrotaxane; a crosslinked body of the above-described polyrotaxane and a polymer; and a material comprising the crosslinked body.

More, other than or in addition to the above objects, an object of the present invention is to provide a method of producing the above-described polyrotaxane, a method of producing the above-described aqueous dispersion composition, a method of producing the crosslinked body and a method of producing the material.

Means for Solving Problems

The present inventors have found following inventions:

<1> A polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), wherein the cyclic molecule comprises a group represented by following formula I, a group represented by following formula II, and a group represented by following formula III:

-M-A　　　　Formula I;

-M-B　　　　Formula II; and

—C　　　　Formula III.

In the formulae, M represents a structure represented by following formula IV or V, wherein Q represents a linear alkylene or alkenylene group having 1 to 8 carbon atoms, a branched alkylene or alkenylene group having 3 to 20 carbon atoms, an alkylene group obtained by substituting a part of the alkylene or alkenylene group with an —O— bond or an —NH— bond, or an alkylene group obtained by substituting a part of the hydrogen atoms of the alkylene group with at least one selected from the group consisting of a hydroxyl group, a carboxyl group, an acyl group, a phenyl group, a halogen atom and an olefin group; and each of n1 and n2 independently represents 1 to 200;

A represents —OX$^1$ or —NX$^2$X$^3$, wherein each of X$^1$, X$^2$ and X$^3$ independently represents a group selected from the group consisting of a hydrogen atom and groups represented by following formulae X-1 to X-7, wherein each of R$_1$, R$_2$, R$_4$ and R$_5$ independently represents a linear alkyl group having 1 to 12 carbon atoms, or a branched or alicyclic alkyl group having 3 to 12 carbon atoms; each of R$_{6a}$, R$_{6b}$ and R$_{6c}$ independently represents a hydrogen atom, a linear alkyl group having 1 to 12 carbon atoms, or a branched alkyl group having 3 to 12 carbon atoms (at least one of R$_{6a}$ to R$_{6c}$ is an alkyl group); R$_3$ represents a substituent obtained by removing three hydrogen atoms from a linear alkyl group having 1 to 12 carbon atoms or a branched alkyl group having 3 to 12 carbon atoms; at least one of Y$_1$ to Y$_3$ represents a group selected from the group consisting of a hydroxyl group, an NH$_2$ group and an SH group, while the rest of Y$_1$ to Y$_3$ are hydrogen atoms; and R$_7$ represents a photoreactive group;

B represents a residue having a group selected from the group consisting of —(OCH$_2$CH$_2$)$_{m1}$OH, wherein m1 represents 1 to 200, —(NHCH$_2$CH$_2$)$_{m2}$NH$_2$, wherein m2 represents 1 to 200, —COOX$^4$, —SO$_3$X$^5$, —PO$_4$X$^6$ [wherein each of X$^4$ to X$^6$ is independently selected from the group consisting of a hydrogen atom, Li, Na, K, NR$_8$R$_9$R$_{10}$R$_{11}$ (wherein each of R$_8$ to R$_{11}$ is independently selected from the group consisting of a hydrogen atom, a linear alkyl group having 1 to 12 carbon atoms, and a branched alkyl group having 3 to 12 carbon atoms), and a pyridinium base], and a pyridine ring derivative group represented by formula VI-1 or formula VI-2, wherein symbol * represents that the site where the pyridine ring is bonded may be any of 2- to 6-position; and in the formula VI-2, X$^{7-}$ represents an ion species selected from the group consisting of Cl$^-$, Br$^-$ and I$^-$; and C represents a group represented by the moiety A and/or moiety B described above.

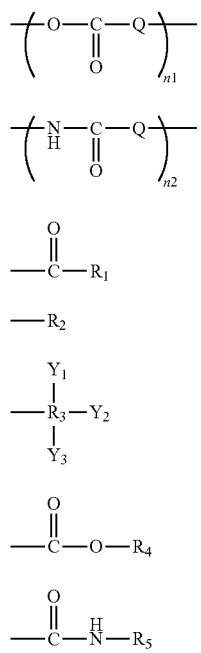

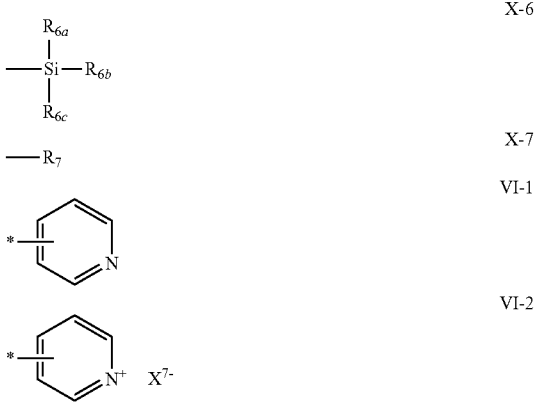

<2> In the above item <1>, X$^1$, or X$^2$ and X$^3$ in A may be a hydrogen atom.

<3> In the above item <1> or <2>, A may be —OX$^1$ and B may be a residue having —COOX$^4$; preferably, A may be —OH and B may be a residue having a group selected from the group of —COOH, —COONH$_4$, —COONH(CH$_3$)$_3$ and —COONH(CH$_2$CH$_3$)$_3$; more preferably, A may be —OH and B may be a residue having —COONH(CH$_2$CH$_3$)$_3$.

<4> In any one of the above items <1> to <3>, M may have a structure represented by the formula IV, and may be derived from ring-opening polymerization of a lactone monomer, preferably ε-caprolactone, γ-butyrolactone, α-methyl-γ-butyrolactone, δ-valerolactone or lactide, more preferably ε-caprolactone.

<5> In any one of the above items <1> to <3>, M may have a structure represented by the formula V, and may be derived from ring-opening polymerization of a lactam monomer, preferably ε-caprolactam, γ-butyrolactam, or DL-α-amino-(-caprolactam, more preferably (-caprolactam.

<6> In any one of the above items <1> to <5>, the cyclic molecule may be selected from the group consisting of (-cyclodextrin, (-cyclodextrin and (-cyclodextrin.

<7> In any one of the above items <1> to <6>, the linear molecule may be selected from the group consisting of polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth) acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. And more specifically, the linear molecule may be selected from the group consisting of polyethylene glycol, polypropylene glycol, polytetrahydrofuran, polydimethylsiloxane, polyethylene and polypropylene, and preferably polyethylene glycol.

<8> In any one of the above items <1> to <7>, the linear molecule may have a molecular weight of 3,000 or more.

<9> In any one of the above items <1> to <8>, the capping group may be selected from the group consisting of dinitrophenyl groups; cyclodextrins; adamantane groups; trityl groups; fluoresceins; pyrenes; substituted benzenes (examples of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

<10> In any one of the above items <1> to <9>, the cyclic molecule may be derived from (-cyclodextrin, and the linear molecule may be polyethylene glycol.

<11> In any one of the above items <1> to <10>, the linear molecule may have the cyclic molecule included in a skewered manner at an amount of 0.001 to 0.6, preferably 0.01 to 0.5, more preferably 0.05 to 0.4 of a maximum inclusion amount, which is defined as an amount at which the cyclic molecules can be included at maximum when the linear molecule has the cyclic molecules included in a skewered manner, and the amount at maximum is normalized to be 1.

<12> An aqueous dispersion composition comprising the polyrotaxane described in any one of the above items <1> to <11>; and a water; wherein the polyrotaxane is dispersed in the water.

<13> In the above item <12>, B may be selected from the group consisting of —$COOX^4$, —$SO_3X^5$, —$PO_4X^6$, and a pyridine ring derivative group represented by the formula VI-2; each of $X^4$ to $X^6$ is independently selected from Li, Na, K, $NR_8R_9R_{10}R_{11}$ (wherein each of $R_8$ to $R_{11}$ is independently selected from the group consisting of a hydrogen atom, a linear alkyl group having 1 to 12 carbon atoms and a branched alkyl group having 3 to 12 carbon atoms), and a pyridinium base.

<14> In the above item <12> or <13>, the content of the polyrotaxane may be 5 to 95 wt %, preferably 8 to 80 wt %, more preferably 10 to 50 wt %, in 100 wt % of the composition.

<15> A material comprising the polyrotaxane described in any one of the above items <1> to <11>.

<16> A material comprising
a) the polyrotaxane described in any one of the above items <1> to <11>; and
b) a polymer;
wherein a) the polyrotaxane and b) the polymer are bound to each other via a covalent bond and/or an ionic bond.

In one embodiment, <16A> the material may consist essentially of the above-described a) and b). Further, in another embodiment, <16B> the material may comprise the above-described a) and b), and the material may be free of a solvent. <16C> In the above item <16A> or <16B>, the material may further have viscoelasticity.

<17> In the above item <16>, b) the polymer may be c) a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s).

<18> In the above item <16> or <17>, b) the polymer may be d) the polyrotaxane described in any one of the above items <1> to <11>.

<19> A material comprising:
a) the polyrotaxane described in any one of the above items <1> to <11>; and/or
e) the material described in any one of the above items <15> to <18>.

<20> A method for producing a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s),
wherein the cyclic molecule comprises a group represented by the above-described formula I, a group represented by the above-described formula II, and a group represented by the above-described formula III (each of the above-described formulae I to III has the same definition as described above):
the method comprising the steps of:
i) preparing the polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s); and
ii) introducing groups represented by the above-described formulae I to III.

<21> A method for producing an aqueous dispersion composition comprising a polyrotaxane; and a water; wherein the polyrotaxane is dispersed in the water,
wherein the polyrotaxane comprises a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s); and
the cyclic molecule comprises a group represented by the above-described formula I, a group represented by the above-described formula II, and a group represented by the above-described formula III (each of the above-described formulae I to III has the same definition as described above):
the method comprising the steps of:
i) preparing the polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s);
ii) introducing groups represented by the above-described formulae I to III; and
iii) dispersing the polyrotaxane obtained in the step ii) in the water.

<22> A method for producing a material comprising
a) a polyrotaxane; and
b) a polymer;

wherein a) the polyrotaxane and b) the polymer are bound to each other via a covalent bond and/or an ionic bond, the polyrotaxane comprises a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s); and the cyclic molecule comprises a group represented by the above-described formula I, a group represented by the above-described formula II, and a group represented by the above-described formula III (each of the above-described formulae I to III has the same definition as described above):

the method comprising the steps of:

i) preparing the polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s);

ii) introducing the groups represented by the formulae I to III;

iii) dispersing the polyrotaxane obtained in the step ii) in the water, to obtain an aqueous polyrotaxane dispersion composition;

iv) depending on b) the polymer, optionally adding b) the polymer into the dispersion composition obtained in the step iii); and v) bonding a) the polyrotaxane and b) the polymer via a covalent bond and/or an ionic bond, in the dispersion composition obtained in the step iii) or iv).

<23> A method for producing a material comprising
a) a polyrotaxane; and
b) a polymer;
wherein a) the polyrotaxane and b) the polymer are bound to each other via a covalent bond and/or an ionic bond, the polyrotaxane comprises a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s); and the cyclic molecule comprises a group represented by the above-described formula I, a group represented by the above-described formula II, and a group represented by the above-described formula III (each of the above-described formulae I to III has the same definition as described above):

the method comprising the steps of:

i) preparing the polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s);

ii) introducing the groups represented by the formulae I to III;

iii) dissolving the polyrotaxane obtained in the step ii) in a solvent, to obtain a polyrotaxane solution;

iv) depending on b) the polymer, optionally adding b) the polymer into the polyrotaxane solution; and v') bonding a) the polyrotaxane and b) the polymer via a covalent bond and/or an ionic bond, in the solution obtained in the step iii) or iv).

<24> In any one of the above items <20> to <23>, the step ii) may comprise the steps of:

ii)-1) polymerizing a monomer and bonding a structure represented by the formula IV or V to the cyclic molecule, to introduce the group represented by the formula I; and ii)-2) bonding the B to a terminal of the structure obtained in the step ii)-1), to introduce the group represented by the formula II.

<25> In the above item <24>, the method may comprise a step of introducing the group represented by the formula III, prior to the step ii)-1).

<26> In any one of the above items <22> to <25>, the method may further comprise a step of removing the solvent in a system, after the step v) or v').

<27> In any one of the above items <22> to <26>, a) the polyrotaxane and b) the polymer may be bound to each other by using a crosslinking agent, in the step v) or v').

<28> In any one of the above items <22> to <27>, a) the polyrotaxane and b) the polymer may be bound to each other by using a catalyst, in the step v) or v').

<29> In any one of the above items <22> to <28>, a) the polyrotaxane and b) the polymer may be bound to each other by photo-irradiation, in the step v) or v').

<30> In any one of the above items <20> to <29>, $X^1$, or $X^2$ and $X^3$ in A may be a hydrogen atom.

<31> In any one of the above items <20> to <30>, A may be —$OX^1$ and B may be a residue having —$COOX^4$; preferably, A may be —OH and B may be a residue having a group selected from the group of —COOH, —$COONH_4$, —$COONH(CH_3)_3$ and —$COONH(CH_2CH_3)_3$; more preferably, A may be —OH and B may be a residue having —$COONH(CH_2CH_3)_3$.

<32> In any one of the above items <20> to <31>, M may have a structure represented by the formula IV, and may be obtained by a ring-opening polymerization of a lactone monomer, preferably ε-caprolactone, γ-butyrolactone, α-methyl-γ-butyrolactone, δ-valerolactone or lactide, more preferably ε-caprolactone.

<33> In any one of the above items <20> to <31>, M may have a structure represented by the formula V, and may be obtained by a ring-opening polymerization of a lactam monomer, preferably ε-caprolactam, γ-butyrolactam, or DL-α-amino-ε-caprolactam, more preferably ε-caprolactam.

Effects of the Invention

The present invention can provide a polyrotaxane, which is hydrophobic and which can use an aqueous solvent in its manufacturing process.

Further, other than or in addition to the above effect, the present invention can provide a polyrotaxane comprising a cyclic molecule(s), wherein the cyclic molecule has a relatively long hydrophobic modified group, and wherein the cyclic molecule partially has a hydrophilic group, thereby to disperse the polyrotaxane in an aqueous solvent satisfactorily.

More, other than or in addition to the above effects, the present invention can provide an aqueous dispersion composition comprising the above-described polyrotaxane.

Further, other than or in addition to the above effects, the present invention can provide a material comprising the above-described polyrotaxane; a crosslinked body of the above-described polyrotaxane and a polymer; and a material comprising the crosslinked body.

More, other than or in addition to the above effects, the present invention can provide a method of producing the above-described polyrotaxane, a method of producing the above-described aqueous dispersion composition, a method of producing the crosslinked body and a method of producing the material.

BEST MODE FOR CARRYING OUT THE INVENTION

The present invention will be described in detail hereinafter.

The present invention provides a polyrotaxane characterized in that a cyclic molecule of the polyrotaxane comprises a group represented by following formula I, a group represented by following formula II, and a group represented by following formula III:

-M-A            Formula I;

-M-B            Formula II; and

—C            Formula III.

Furthermore, the term "a pseudopolyrotaxane" used herein means a compound, which has a linear molecule and a cyclic molecule(s) in which the linear molecule is included in a cavity (cavities) of the cyclic molecule(s) in a skewered manner.

Further, the term "a polyrotaxane" used herein means a compound, in which a capping group locates at each end of the "pseudopolyrotaxane", in other words, at each end of the linear molecule in the "pseudopolyrotaxane", in order to prevent the dissociation of the cyclic molecule(s). In other words, a "pseudopolyrotaxane" means a "polyrotaxane" without a capping group located at each end thereof.

Further, the present invention provides an aqueous dispersion composition comprising the polyrotaxane in which the cyclic molecule has groups represented by the above-described formulae I to III; and a water, wherein the polyrotaxane is dispersed in the water; a material comprising the polyrotaxane; a material comprising a crosslinked body of the polyrotaxane and a polymer; as well as methods thereof.

For intuitive understanding of the term "polyrotaxane in which the cyclic molecule has groups represented by the above-described formulae I to III" of the present application, the term will be explained with reference to drawings. FIG. 1 is a schematic diagram illustrating the "polyrotaxane in which the cyclic molecule has groups represented by the above-described formulae I to III" according to the present invention. In FIG. 1, reference numeral 1 represents the linear molecule, reference numeral 2 the capping group, reference numeral 3 the cyclic molecule, and reference numeral 4 the moiety "M" in the formula I or II. Further, reference numeral 5 simply represents the moiety "A" in the formula I, reference numeral 6 the moiety "B" in the formula II, and reference numeral 7 the moiety "C" in the formula III. The polyrotaxane is formed such that the linear molecule 1 is included in cavities of the cyclic molecules 3 in a skewered manner, and the capping groups 2 locate at each end of the pseudopolyrotaxane in order to prevent the dissociation of the cyclic molecules 3. Further, in FIG. 1, the cyclic molecules 3 respectively have a group represented by the formula I ("-M-A" represented by reference numerals 4 and 5), a group represented by the formula II ("-M-B" represented by reference numerals 4 and 6), and a group represented by the formula III ("C" represented by reference numeral 7). Furthermore, in the present application, one polyrotaxane molecule may have a group represented by the formula I, a group represented by the formula II and a group represented by the formula III, and it is not necessarily essential for each of the cyclic molecules to have the groups represented by the formulae I to III.

<Groups Represented by Formulae I to III>

The groups represented by the formulae I to III will be described in detail.

In the group represented by the formula I, "-M-A", M has a structure of the formula IV or V.

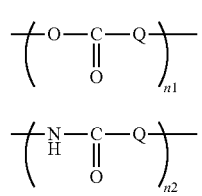

M may be a so-called homopolymer or a so-called copolymer, as long as the moiety has a unit represented by the formula IV or V. That is, Q's in the units represented by the formula IV or V that are adjacent to each other, may be same or different. If M has different Q's (in the case of the so-called copolymer form), the copolymer may be in the form of a random copolymer, a block copolymer, an alternating copolymer, or a copolymer having another form.

M may be derived from ring-opening polymerization of a lactone monomer and/or a lactam monomer.

Examples of the lactone monomer may include, but are not limited to, 4-membered cyclic lactones such as β-propiolactone, β-methylpropiolactone, L-serine-β-lactone derivatives and the like; 5-membered cyclic lactones such as γ-butyrolactone, γ-hexanolactone, γ-heptanolactone, γ-octanolactone, γ-decanolactone, γ-dodecanolactone, α-hexyl-γ-butyrolactone, α-heptyl-γ-butyrolactone, α-hydroxy-γ-butyrolactone, γ-methyl-γ-decanolactone, α-methylene-γ-butyrolactone, α,α-dimethyl-γ-butyrolactone, D-erythronolactone, α-methyl-γ-butyrolactone, γ-nonanolactone, DL-pantolactone, γ-phenyl-γ-butyrolactone, γ-undecanolactone, γ-valerolactone, 2,2-pentamethylene-1,3-dioxolan-4-one, α-bromo-γ-butylolactone, γ-crotonolactone, α-methylene-γ-butylolactone, α-methacryloyloxy-γ-butyrolactone, β-methacryloyloxy-γ-butyrolactone and the like; 6-membered cyclic lactones such as δ-valerolactone, δ-hexanolactone, δ-octanolactone, δ-nonanolactone, δ-decanolactone, δ-undecanolactone, δ-dodecanolactone, δ-tridecanolactone, δ-tetradecanolactone, DL-mevalonolactone, 4-hydroxy-1-cyclohexanecarboxylic acid δ-lactone and the like; 7-membered cyclic lactones such as ε-caprolactone and the like; lactides and 1,5-dioxepan-2-one. The lactone monomer may be preferably ε-caprolactone, γ-butyrolactone, α-methyl-γ-butyrolactone, δ-valerolactone or lactide, and more preferably ε-caprolactone.

Further, examples of the lactam monomer may include, but are not limited to, 4-membered cyclic lactams such as 4-benzoyloxy-2-azetidinone and the like; 5-membered cyclic lactams such as γ-butyrolactam, 2-azabicyclo[2.2.1]hept-5-en-3-one, 5-methyl-2-pyrrolidone and the like; 6-membered cyclic lactams such as ethyl 2-piperidone-3-carboxylate and the like; 7-membered cyclic lactams such as ε-caprolactam, DL-α-amino-ε-caprolactam and the like; and ω-heptalactam. The lactam monomer may be preferably ε-caprolactam, γ-butyrolactam, or DL-α-amino-ε-caprolactam, and more preferably ε-caprolactam.

In the formula, Q represents a linear alkylene or alkenylene group having 1 to 8 carbon atoms, a branched alkylene or alkenylene group having 3 to 20 carbon atoms, an alkylene group obtained by substituting a part of the aforementioned alkylene group or alkenylene group with an —O— bond or an —NH— bond, or an alkylene group obtained by substituting a part of the hydrogen atoms of the aforementioned alkylene group with at least one selected from the group consisting of a hydroxyl group, a carboxyl group, an acyl group, a phenyl group, a halogen atom and an olefin group. Q may be preferably a linear alkylene group having 3 to 8 carbon atoms, or a branched alkylene group having 5 to 10 carbon atoms, and more preferably a linear alkylene group having 4 to 6 carbon atoms.

n1 and n2 each independently represents 1 to 200, preferably 2 to 100, and more preferably 3 to 50. Furthermore, although n1 and n2 are both integers in view of the structure, since n1 and n2 are derived from a polymer obtained from the above-mentioned monomers, and since the polymer has molecular weight distribution, in fact, n1 and n2 are not limited to integers.

A represents —$OX^1$ or —$NX^2X^3$. Each of $X^1$, $X^2$ and $X^3$ independently represents a group selected from the group consisting of hydrogen and groups represented by following formulae X-1 to X-7. Furthermore, each of $R_1$, $R_2$, $R_4$ and $R_5$ independently represents a linear alkyl group having 1 to 12 carbon atoms, or a branched or alicyclic alkyl group having 3 to 12 carbon atoms; and each of $R_{6a}$, $R_{6b}$ and $R_{6c}$ independently represents a hydrogen atom, a linear alkyl group having 1 to 12 carbon atoms, or a branched alkyl group having 3 to 12 carbon atoms (at least one of $R_{6a}$ to $R_{6c}$ is an alkyl group). $R_3$ represents a substituent obtained by removing three hydrogen atoms from a linear alkyl group having 1 to 12 carbon atoms or a branched alkyl group having 3 to 12 carbon atoms, and at least one of $Y_1$ to $Y_3$ represents a group selected from the group consisting of a hydroxyl group, a $NH_2$ group and an SH group, while the rest of $Y_1$ to $Y_3$ are hydrogen atoms. $R_7$ represents a photoreactive group.

It is preferable that $X_1$, or $X_2$ and $X_3$ in A be a hydrogen atom.

Among the groups represented by the formula X-1, $R_1$ may be a linear alkyl group having 1 to 12 carbon atoms, preferably 1 to 9 carbon atoms, and more preferably 1 to 5 carbon atoms, or a branched alkyl group having 3 to 12 carbon atoms, preferably 3 to 9 carbon atoms, and more preferably 3 to 5 carbon atoms. Examples of the group represented by the formula X-1 may include, but are not limited to, —CO—$CH_3$, —CO—$CH_2CH_3$, —CO—$CH_2CH_2CH(CH_3)CH_3$ and the like.

Among the groups represented by the formula X-2, $R_2$ may be a linear alkyl group having 1 to 12 carbon atoms, preferably 1 to 9 carbon atoms, and more preferably 1 to 5 carbon atoms, or a branched alkyl group having 3 to 12 carbon atoms, preferably 3 to 9 carbon atoms, and more preferably 3 to 5 carbon atoms, as is similar to $R_1$. Examples of the group represented by the formula X-2 may include, but are not limited to, —$CH_3$, —$CH_2CH_3$, —$CH_2CH(CH_3)CH_3$ and the like.

Among the groups represented by the formula X-3, $R_3$ may be a substituent obtained by removing three hydrogen atoms from a linear alkyl group having 1 to 12 carbon atoms, preferably 1 to 9 carbon atoms, and more preferably 1 to 5 carbon atoms, or from a branched alkyl group having 3 to 12 carbon atoms, preferably 3 to 9 carbon atoms, and more preferably 3 to 5 carbon atoms. At least one of $Y_1$ to $Y_3$ is a group selected from the group consisting of a hydroxyl group, a $NH_2$ group and a SH group, while the rest of $Y_1$ to $Y_3$ may be a hydrogen atom. Examples of the group represented by the formula X-3 may include, but are not limited to, —$CH_2CH(OH)CH_3$, —$CH_2CH(OH)CH_2OH$, —$CH_2CH(NH_2)CH_3$ and the like.

Among the groups represented by the formula X-4, $R_4$ may be a linear alkyl group having 1 to 12 carbon atoms, preferably 1 to 9 carbon atoms, and more preferably 1 to 5 carbon atoms, or a branched alkyl group having 3 to 12 carbon atoms, preferably 3 to 9 carbon atoms, and more preferably 3 to 5 carbon atoms, as is similar to $R_1$. Examples of the group represented by the formula X-4 may include, but are not limited to, —CO—$OCH_3$, —CO—$OCH_2CH_3$, —CO—$OCH_2CH(CH_3)CH_3$ and the like.

Among the groups represented by the formula X-5, $R_5$ may be a linear alkyl group having 1 to 12 carbon atoms, preferably 1 to 9 carbon atoms, and more preferably 1 to 5 carbon atoms, or a branched alkyl group having 3 to 12 carbon atoms, preferably 3 to 9 carbon atoms, and more preferably 3 to 6 carbon atoms, as is similar to $R_1$. Examples of the group represented by the formula X-5 may include, but are not limited to, —CO—NH—$CH_2CH_3$, —CO—NH—$(CH_2)_3CH_3$, —CO—NH—$(CH_2)_5CH_3$, —CO—NH—$CH(CH_3)_2$ and the like.

Among the groups represented by the formula X-6, $R_{6a}$ to $R_{6c}$ may be each a linear alkyl group having 1 to 12 carbon atoms, preferably 1 to 9 carbon atoms, and more preferably 1 to 5 carbon atoms, or a branched alkyl group having 3 to 12 carbon atoms, preferably 3 to 9 carbon atoms, and more preferably 3 to 5 carbon atoms. Examples of the group represented by the formula X-6 may include, but are not limited to, —Si—$(CH_3)_3$, —Si—$(CH_2CH_3)_3$, —Si—$(CH(CH_3)_2)_3$ and the like.

Among the groups represented by the formula X-7, $R_7$ represents a photoreactive group. The photoreactive group may be a group having an unsaturated bond group (for example, an unsaturated double bond group) or a photosensitive group, for example, an organic residue.

The unsaturated group, for example, an unsaturated double bond group, may be an olefinyl group, and examples thereof may include, but are not limited to, an acryl group, a methacryl group, a vinyl ether group, a styryl group and the like.

Examples of the photosensitive group may include, but are not limited to, a cinnamoyl group, a cinnamylidene group, a chalcone residue, an isocoumarin residue, a 2,5-dimethoxystilbene residue, a thymine residue, a styrylpyridinium residue, an α-phenylmaleimide residue, anthracene residue, a 2-pyrrone residue and the like.

Among the groups represented by the formulae X-1 to X-7 as the moiety A of the group represented by the formula I, the groups represented by the formulae X-1, X-3, X-5 and X-7 are preferred, and the groups represented by the formulae X-1, X-3 and X-7 are more preferred.

In the group represented by the formula II, "-M-B", the moiety M has the same definition as described above.

Further, B represents a residue having a group selected from the group consisting of —$(OCH_2CH_2)_{m1}OH$ wherein m1 represents 1 to 200, —$(NHCH_2CH_2)_{m2}NH_2$ wherein m2 represents 1 to 200, —$COOX^4$, —$SO_3X^5$, —$PO_4X^6$ [wherein each of $X^4$ to $X^6$ is independently selected from the group consisting of a hydrogen atom, Li, Na, K, $NR_8R_9R_{10}R_{11}$ (wherein each of $R_8$ to $R_{11}$ is independently selected from the group consisting of a hydrogen atom, a linear alkyl group having 1 to 12 carbon atoms, and a branched alkyl group having 3 to 12 carbon atoms), a pyridinium base], and a pyridine ring derivative group represented by formula VI-1 or formula VI-2 (in the formula VI-1 or VI-2, symbol * represents that the site where the pyridine ring is bonded may be any of the 2- to 6-position; and in the formula VI-2, $X^{7-}$ represents an ion species selected from the group consisting of $Cl^-$, $Br^-$ and $I^-$). Furthermore, m1 and m2 are integers in view of the structure, but due to molecular weight distribution depending on the conditions for the introduction of B or the like, m1 and m2 are not limited to integers.

The moiety of B will be further explained by using the "residue having —COOX$^4$," which is an example of the moiety B. That is, "having" —COOX$^4$ means that the moiety M and the group —COOX$^4$ may be linked via a single bond or may be linked via another group (generally, a divalent group).

The moiety B may be preferably —COOX$^4$ or —SO$_3$X$^5$, and more preferably —COOX$^4$.

The moiety C is a group represented by the above-mentioned A and/or B. Here, the expression "and/or" means to include the case where C is a group represented by A, the case where C is a group represented by B, and the case where C is both a group represented by A and a group represented by B.

When the moiety C of the group represented by the formula III is A, among the groups represented by the formulae X-1 to X-7 as the moiety A, the groups represented by the formulae X-1 and X-3 are preferred, and the group represented by the formula X-3 is more preferred.

As such, when the polyrotaxane according to the present invention in which the cyclic molecule(s) has groups represented by the formulae I to III, is used, an aqueous dispersion composition can be formed since the polyrotaxane retains a hydrophilic moiety while being hydrophobic. Thus, workability such as handling ability, the range of the selection of solvent(s), and in the case of incorporating other multicomponent materials, the incorporatability of the materials can be enhanced.

Further, when the cyclic molecule(s) has the groups represented by the formulae I to III, the following effects are offered: When the polyrotaxane according to the present invention is used as a material that will be described below, for example, as a coating material in a variety of applications, the moiety M has a function of imparting flexibility and compatibility with other compositions or solvents. More specifically, for example, the moiety M having a branched structure can lower the glass transition temperature or the degree of crystallization of the material.

Further, when the moiety A is a hydroxyl group or an amino group, the moiety A serves as a moiety for crosslinking the polyrotaxane according to the present invention and another polymer via a covalent bond, and takes charge of functions related to the curing characteristics of the material. More, the groups represented by X-1 to X-7 introduced into a part or all of the moiety A can impart special functional properties, for example, a function for the fine adjustment of the hardness of the material, a function for photocuring, a function for antifouling and the like.

The moiety B imparts satisfactory dispersibility to water or an aqueous solvent as a result of partial hydrophilization of the material, and can impart to the polyrotaxane an important function of making it possible of the use of an aqueous solvent during the applied processes. In addition, when the moiety B is an ionic group such as a carboxyl group, there is provided an effect of making it possible of achieving crosslinking via an ionic bond, for the crosslinking between polyrotaxanes or between a polyrotaxane and another polymer, by using a metal complex.

The moiety C can impart various auxiliary functions to the material. For example, specifically, when a group such as a hydroxypropyl group is introduced as the moiety C prior to a process of polymerizing M into the polyrotaxane as described later, an enhancement of the compatibility of the polyrotaxane with a polymerizable monomer can be attained. In addition, the introduction of C can make it possible to control the polymerization density (polymerizable site on the cyclic molecule) of a monomer, or to impart special functions such as a photocurable group.

In addition to the characteristics originating from these "groups represented by the formulae I to III," the synergistic effect obtained from the aforementioned characteristics and the characteristics originating from the structure in which the cyclic molecule(s) of the polyrotaxane has a relative movement (sliding) along the linear molecule, allows application of the polyrotaxane in a wide variety of fields as a highly functional material having, for example, excellent stretchability, stress-relieving properties, durability, scratch resistance and impact resistance.

Hereinafter, elements constituting the polyrotaxane will be described respectively.

<<Cyclic Molecule>>

The cyclic molecule of the polyrotaxane according to the present invention is not particularly restricted as long as a linear molecule is included in cavities of the cyclic molecules in a skewered manner.

The cyclic molecule may be one having hydroxy groups, for example, may be selected from the group consisting of α-cyclodextrin, β-cyclodextrin and γ-cyclodextrin. In a case where the cyclic molecule has hydroxy groups, a part of the hydroxy groups may be substituted with other group(s). Furthermore, examples of the other group(s) may include, but are not limited to, a hydrophlicating group having an ability to hydrophlicate the polyrotaxane according to the present invention, a hydrophobicating group having an ability to hydrophobicate the polyrotaxane according to the present invention, a photoreactive group and the like.

<<Linear Molecule>>

The linear molecule of a polyrotaxane according to the present invention is not limited as long as the linear molecule may be included in a cavity (cavities) of the cyclic molecule(s) in a skewered manner.

For example, the linear molecule may include polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. More specifically, the linear molecule may be selected from the group consisting of polyethylene glycol, polypropylene glycol, polytetrahydrofuran, polydimethylsiloxane, polyethylene and polypropylene, and preferably polyethylene glycol.

A molecular weight of the linear molecule may be 3,000 or more.

In the polyrotaxane according to the present invention, the cyclic molecule may be derived from α-cyclodextrin, and the linear molecule may be polyethylene glycol.

The linear molecule may have the cyclic molecules included in a skewered manner at an amount of 0.001 to 0.6, preferably 0.01 to 0.5, and more preferably 0.05 to 0.4 of a maximum inclusion amount, which is defined as an amount at which the cyclic molecules can be included at maximum when the linear molecule has the cyclic molecules included in a skewered manner, and the amount at maximum is normalized to be 1.

The maximum inclusion amount of a cyclic molecule can be determined depending on the length of a linear molecule and the thickness of a cyclic molecule. For example, when the linear molecule is polyethylene glycol and the cyclic molecule is α-cyclodextrin molecule, the maximum inclusion amount is measured experimentally (see, Macromolecules 1993, 26, 5698-5703, whole contents of which are incorporated herein by reference).

<<Capping Group>>

The capping group of the polyrotaxane according to the present invention is not limited, as long as the group is located at both ends of a pseudopolyrotaxane, and the group has an action of preventing dissociation of a cyclic molecule(s) from a linear molecule.

For example, the capping group may be selected from the group consisting of dinitrophenyl groups; cyclodextrins; adamantane groups; trityl groups; fluoresceins; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

<Aqueous Dispersion Composition>

The present invention provides an aqueous polyrotaxane dispersion composition comprising the polyrotaxane in which the cyclic molecule(s) has the groups represented by the formulae I to III as described above; and water, wherein the polyrotaxane is dispersed in water.

Furthermore, the constituent components of the polyrotaxane, and the groups represented by the formulae I to III are as described above.

For the reasons such as improving the affinity with water, the moiety B may be selected from the group consisting of $—COOX^4, —SO_3X^5, —PO_4X^6$ and a pyridine ring derivative group represented by the formula VI-2. Each of $X^4$ to $X^6$ may be independently selected from the group consisting of Li, Na, K, $NR_8R_9R_{10}R_{11}$ (wherein each of $R_8$ to $R_{11}$ is independently selected from the group consisting of a hydrogen atom, a linear alkyl group having 1 to 12 carbon atoms, and a branched alkyl group having 3 to 12 carbon atoms), and a pyridinium base.

The content of the polyrotaxane in 100 wt % of the composition may be 5 to 95 wt %, preferably 8 to 80 wt %, and more preferably 10 to 50 wt %, depending on the constituent components of the polyrotaxane, other components contained in the composition, the application field of the composition or the like.

The aqueous polyrotaxane dispersion composition may also contain any component(s) other than the polyrotaxane in which the cyclic molecule(s) has the groups represented by the formulae I to III; and water.

Examples of the components may be, but are not limited to, a surfactant, a plasticizer, a viscosity adjusting agent, inorganic fine particles and the like, depending on the constituent components of the polyrotaxane, the application field of the composition or the like.

Furthermore, examples of the surfactant may include, but are not limited to, nonionic surfactants such as polyoxyethylene(8) octyl phenyl ether, sorbitan polyoxyethylene trioleate, sorbitan polyoxyethylene monostearate and the like; and ionic surfactants such as sodium dodecyl sulfate, sodium dodecyl sulfonate, triethanolamine dodecyl sulfate, dodecyltrimethylammonium salts, dodecylpyridinium chloride and the like.

Examples of the plasticizer may include, but are not limited to, dibutyl phthalate, di-2-ethylhexyl phthalate, butyl benzyl phthalate, dihexyl phthalate, dioctyl adipate, tricresyl phosphate and the like.

Examples of the viscosity adjusting agent may include, but are not limited to, carboxyvinyl polymers, propylene glycol alginate, ethylcellulose, sodium carboxymethylcellulose, polyacrylic acid sodium and the like.

Examples of the inorganic fine particles may include, but are not limited to, silica, alumina, titanium oxide, silicon carbide and the like.

<Crosslinked Body Comprising the Polyrotaxane According to the Present Invention, and Material Comprising the Crosslinked Body>

The present invention provides a material comprising a crosslinked body comprising: a) the polyrotaxane in which the cyclic molecule(s) has the groups represented by the formulae I to III as described above, and b) a polymer; or a material consisting essentially of the crosslinked body.

The term "polymer" used herein means: c) solely the "polyrotaxane," and d) a polymer including the "polyrotaxane in which the cyclic molecule(s) has the groups represented by the formulae I to III". The "polymer" also includes: e) a polymer other than the above-mentioned item c) or d).

In short, the crosslinked body according to the present invention means a crosslinked body formed from the "polyrotaxane in which the cyclic molecule(s) has the groups represented by the formulae I to III" and any one or more polymers selected from the above-mentioned items c) to e).

In one embodiment, the present invention can provide a material consisting essentially of the above-mentioned items a) and b), depending on the linear molecule to be used, the cyclic molecule(s) to be used, the groups represented by the formulae I to III to be used, the polymer to be used, and the like. Further, in another embodiment, the present invention can provide a material comprising the items a) and b), which is a solvent-free material. More, in one embodiment, the materials may further have viscoelasticity.

The material consisting essentially of the crosslinked body or the material comprising the crosslinked body can provide a material having the properties inherently possessed by the "polyrotaxane," for example, viscoelastic properties. Further, a material which also has the properties originating from the "groups represented by the formulae I to III" can be provided. Furthermore, the present invention can provide a material having viscoelasticity in the absence of solvent. According to the crosslinked polyrotaxane described in JP No. 3475252, a crosslinked polyrotaxane having viscoelasticity in the presence of a solvent was provided for the first time; however, the material according to the present invention can provide a material having viscoelasticity even in the absence of solvent.

The "e) polymer other than the above-described c) or d)" may be a homopolymer or a copolymer. The polymer may have, at back bone chain or side chain, at least one selected from the group consisting of a —OH group, a —NH$_2$ group, a —COOH group, a —COOH group neutralized with a base, a —SO$_3$H group, a —SO$_3$H group neutralized with a base, an epoxy group, an oxetane group, an anhydride group, an alkoxysilane group, a vinyl group, a thiol group and a photo-crosslinkable group.

The "e) polymer other than the above-described c) or d)" may have two or more polymers. In a case where two or more polymers are present, at least one polymer may be bound to the a) polyrotaxane through a cyclic molecule. In a case where the polymer is a copolymer, it may be composed of two, or three or more monomers. In the case of a copolymer, the copolymer may be one of a block copolymer, an alternating copolymer, a random copolymer, a graft copolymer and the like.

Examples of the "e) polymer other than the above-described c) or d)" may include, but are not limited to, polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. The derivatives may contain the above-described group, i.e., at least one selected from the group consisting of a —OH group, a —NH$_2$ group, a —COOH group, a —COOH group neutralized with base, a —SO$_3$H group, a —SO$_3$H group neutralized with base, an epoxy group, an oxetane group, an anhydride group, an alkoxysilane group, a vinyl group, a thiol group and a photo-crosslinkable group.

At least a part of the "e) polymer other than the above-described c) or d)" may be physically and/or chemically crosslinked with another "e) polymer other than the above-described c) or d)".

The material according to the present invention can be applied to a wide variety of fields as a highly functional material having, for example, excellent stretchability, stress-relieving properties, durability, scratch resistance and impact resistance, due to the synergistic effect obtained from the aforementioned characteristics originating from the "groups represented by the formulae I to III" and the characteristics originating from the structure in which the cyclic molecule(s) of the polyrotaxane has a relative movement (sliding) along the linear molecule. Specifically, the material according to the present invention can be applied to adhesives, glues, additives for curable structures, paints, coating agents, (resin) waxes, sealing materials, ink additives, ink binders, electrically insulating materials, materials for electrical/electronic parts, piezoelectric materials, optical materials, vibration-proof/vibration control/vibration-free materials, friction control agents, cosmetic materials, rubber additives, rheology control agents, thickening agents, dispersants, pigment dispersants, fibers (as an additive), medical biomaterials, and the like, but the application fields are not limited to these.

<Method for Producing a Polyrotaxane in which a Cyclic Molecule(s) has Groups Represented by Formulae I to III>

The present invention provides a method for producing the "polyrotaxane in which the cyclic molecule(s) has the groups represented by the formulae I to III" described above.

The "polyrotaxane in which the cyclic molecule(s) has the groups represented by the formula I to III" according to the present invention can be obtained by, for example, the following method:

The method comprises the steps of:

i) preparing a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s); and ii) introducing the groups represented by the formulae I to III into the cyclic molecule(s), to produce the polyrotaxane in which the cyclic molecule(s) has the groups represented by the formulae I to III.

Furthermore, the terms "polyrotaxane" and "groups represented by the formulae I to III" have the same definitions as described above.

The step i) is a step of preparing a polyrotaxane. The polyrotaxane can be obtained by referring to documents published before filing the present application (for example, WO2005-080469 and WO2005-108464 (whole contents thereof are incorporated herein by reference)).

The step ii) is a step of introducing the groups represented by the formulae I to III into the cyclic molecule(s).

For example, in the case of using α-cyclodextrin (hereinafter, the "cyclodextrin" may be abbreviated to "CD") as the cyclic molecule, the group represented by the formula III may have already been introduced by the hydroxyl group of the α-CD.

The group represented by the formula I and the group represented by the formula II can be obtained by, for example, the following step ii)-1) and step ii)-2):

ii)-1) a step of introducing the group represented by the formula I by polymerizing a monomer and thereby linking a structure represented by the formula IV or V to the cyclic molecule(s); and ii)-2) a step of introducing the group represented by the formula II by linking the moiety B to the ends of the structure obtained by the step ii)-1), via a covalent bond.

Furthermore, as the group represented by the formula I, a group in which the moiety A is a hydroxyl group can be obtained by, for example, ring-opening polymerization of ε-caprolactone. In this case, the group represented by the formula I can be introduced into the cyclic molecule by subjecting ε-caprolactone to ring-opening polymerization at a temperature of 50° C. to 120° C. and normal pressure, in the absence of solvent or in the presence of a toluene solvent.

Furthermore, examples of the catalyst used in the ring-opening polymerization may include, but are not limited to, tin catalysts such as tin 2-ethylhexanoate, tin di-n-butyl dilaurate, tin dioctyl dilaurate and the like; organic alkali metals such as n-butyllithium and the like; and metal alkoxides such as aluminum triisopropyl alkoxide, lithium trimethyl silanolate and the like.

More, as the group represented by the formula II, a group in which the moiety B is $-OCO(CH_2)_2COONH(CH_2CH_3)_3$ can be obtained as follows: The group represented by the formula II can be introduced into the cyclic molecule by reacting the moiety A of the group represented by the formula I that has been introduced into the cyclic molecule as described above, with succinic anhydride at room temperature to 120° C. and normal pressure in the absence of solvent or in the presence of a toluene solvent, followed by removing the solvent, and neutralizing the residue with triethylamine.

Further, instead of succinic anhydride, butylsuccinic anhydride, 2-dodecen-1-ylsuccinic anhydride, allylsuccinic anhydride, 2-buten-1-ylsuccinic anhydride, 3,3-dimethylglutaric anhydride, 1,1-cyclopentanediacetic anhydride, diglycolic anhydride, trimellitic anhydride and the like may also be used.

The step of introducing the group represented by the formula III is preferably provided prior to the step ii)-1) described above. For example, in the case of using an acetyl group as the group represented by the formula III, an acetyl group as the group represented by the formula III can be introduced into the cyclic molecule by reacting the moiety A with acetic anhydride at room temperature to 120° C. and normal pressure in an N,N-dimethylacetamide solvent. Furthermore, examples of the technique for introducing the group represented by the formula III into the cyclic molecule may include, but are not limited to, the technique for introducing a nonionic group described in WO 2005/080469 (furthermore, the disclosure of this document has been incorporated herein by reference); the technique for introducing an ionic group described in WO 2005/108464 (furthermore, the disclosure of this document has been incorporated herein by reference); the technique for modification described in WO 2006/088200 (furthermore, the disclosure of this document has been incorporated herein by reference); and the technique for introducing a photoreactive group that described below.

Furthermore, when "—C", the group represented by the formula III, is represented by the formula X-3, the moiety M of the formula I or II may be formed as a result of the polymerization of M into the —OH group or the amino group in the formula X-3.

<Method for Producing an Aqueous Dispersion Composition>

The present invention provides a method for producing an aqueous polyrotaxane dispersion composition that has the "polyrotaxane in which the cyclic molecule(s) has the groups represented by the formulae I to III" and water, in which the polyrotaxane is dispersed.

Furthermore, the terms "polyrotaxane" and "groups represented by the formulae I to III" have the same definitions as described above.

The aqueous dispersion composition can be obtained by the method for producing the "polyrotaxane in which the cyclic molecule(s) has the groups represented by the formulae I to III" described above, which method further includes the following step.

That is, the aqueous dispersion composition can be obtained by a method including: iii) a step of dispersing the polyrotaxane obtained in the step ii) in water.

In the step iii), the term "water" means both the case of being only "water" and the case of being "a solvent containing water".

Furthermore, in addition to water, a hydrophilic solvent such as n-butanol, 4-hydroxy-4-methyl-2-pentanone, 2-ethylhexanol, ethylene glycol monoethyl ether, ethylene glycol monobutyl ether, propylene glycol monopropyl ether, propylene glycol monobutyl ether, diethylene glycol monomethyl ether, triethylene glycol monomethyl ether, 3-methoxy-3-methyl-1-butanol, ethylene glycol monomethyl ether acetate, propylene glycol monomethyl ether acetate, diethylene glycol monobutyl ether acetate, diethylene glycol monoethyl ether acetate, N-methyl-2-pyrrolidone or the like; or a hydrophobic solvent such as toluene, xylene, butyl acetate, methyl ethyl ketone, cyclohexanone or the like; may also be used in combination.

Conventionally known techniques can be used as the technique for dispersion. For example, the techniques may be, but are not limited to, a technique of adding a surfactant to the polyrotaxane obtained in the step ii), and slowly adding dropwise the mixture into water or a solvent containing water under vigorous stirring can be used.

<Method for Producing Crosslinked Body Comprising Polyrotaxane According to the Present Invention>

The present invention provides a method for producing a material comprising: a) the "polyrotaxane in which the cyclic molecule(s) has the groups represented by the formulae I to III"; and b) a polymer, wherein the a) polyrotaxane and the b) polymer are linked via a covalent bond and/or an ionic bond.

As the production method, two techniques such as a technique of using the "aqueous dispersion composition" described above and a technique without using the composition are provided.

<<Technique of Using an "Aqueous Dispersion Composition">>

An aqueous dispersion composition is obtained by the steps i) to iii) described above.

The method comprises, subsequently, iv) depending on the polymer b), a step of adding the polymer b) to the dispersion composition obtained in the step iii), may be provided; and v) a step of linking the a) polyrotaxane and b) polymer via a covalent bond and/or an ionic bond in the dispersion composition obtained in the step iii) or iv);

thereby to obtain a material comprising a crosslinked body of the components a) and b).

<<Technique without Using an "Aqueous Dispersion Composition">>

The "polyrotaxane in which the cyclic molecule(s) has the groups represented by the formulae I to III" is obtained by the steps i) and ii) described above.

The method comprises the steps of, subsequently, iii') dissolving the polyrotaxane obtained in the step ii) in a solvent to obtain a polyrotaxane solution;

iv') depending on the polymer b), adding the polymer b) to the polyrotaxane solution, optionally; and v') linking the a) polyrotaxane and b) polymer via a covalent bond and/or an ionic bond in the solution obtained in the step iii') or iv');

thereby to obtain a material comprising a crosslinked body of the components a) and b).

The two techniques described above, that is, the technique of using the "aqueous dispersion composition" and the technique without using the dispersion composition, are different from each other in the aspect that the solvent used in the step iii) or the step iii') is "water" or a "solvent other than water," but the techniques are almost similar to each other in terms of other aspects. Thus, hereinafter, the techniques will be considered to be identical, unless particularly stated otherwise.

The solvent used in the step iii') is a "solvent other than water". The "solvent other than water" is not particularly limited as long as it dissolves the polyrotaxane according to the present invention, but examples thereof may include toluene, xylene, ethyl acetate, butyl acetate, acetone, methyl ethyl ketone, cyclohexanone, tetrahydrofuran, 1,4-dioxane, dimethylsulfoxide, N,N-dimethylacetamide, N,N-dimethylformamide and N-methyl-2-pyrrolidone.

In the step iv) or iv'), when a polymer other than the "polyrotaxane in which the cyclic molecule(s) has the groups represented by the formulae I to III" is contained, the solvent for the step iii) or iii') may be selected taking the solubility of the polymer into consideration.

The step v) or v') is a step of bonding a) a polyrotaxane and b) a polymer via a covalent bond and/or an ionic bond. In the step, depending on a polyrotaxane used and a polymer used, various methods can be used.

For example, in the step v) or v'), a) a polyrotaxane and b) a polymer can be bound to each other by using a crosslinking agent. The method can be used when, for example, "a polyrotaxane having a cyclic molecule having groups represented by formulae I to III" has a hydroxyl group in the cyclic molecule.

Examples of the crosslinking agent may include, but are not limited to, cyanuric chloride, trimesoyl chloride, terephthaloyl chloride, epichlorohydrin, dibromobenzene, glutaraldehyde, aliphatic polyfunctional isocyanate, aromatic polyfunctional isocyanate, tolylene diisocyanate, hexamethylene diisocyanate, divinyl sulfone, 1,1'-carbonyldiimidazole, acid anhydrides such as ethylenediaminetetraacetic dianhydride and mesobutane-1,2,3,4-tetracarboxylic dianhydride, polyfunctional acid hydrazines, polyfunctional carboimides, alkoxysilanes, and derivatives thereof.

Furthermore, in the case of using the aqueous dispersion composition, examples of the crosslinking agent may include, depending on the constitution of the polyrotaxane, the composition and the like, but are not limited to, hydrazine compounds such as adipic acid dihydrazide, isophthalic acid dihydrazide, sebacic acid dihydrazide, and dodecanedioic acid dihydrazide; polyfunctional aziridine compounds such as Chemitite DZ-22E and PZ-33 (manufactured by Nippon Shokubai Co., Ltd.); polyfunctional carbodiimides such as SV-02, V-02, V-02-L2, V-04, E-01 and E-02 (manufactured by Nisshinbo Holdings, Inc.), aqueous poloyfunctional epoxy compounds, alkoxysilane compounds, aqueous melamine resins; aqueous block isocyanate compounds; water-dispersed type isocyanate compounds such as Duranate WB40-100, WB40-80D, WT20-100, WT30-100 and WE50-100 (manufactured by Asahi Kasei Corp.); and aqueous oxazoline compounds such as Epocros K-2010E, K-2020E and K-2030E (manufactured by Nippon Shokubai Co., Ltd.).

For example, in the step v) or v'), a) a polyrotaxane and b) a polymer can be bound to each other by using a catalyst. The method can be used in a case where, for example, "a polyrotaxane having a cyclic molecule having groups represented by formulae I to III" has a reactive group such as an epoxy group, and an acid anhydride in the cyclic molecule.

The catalyst used depends on a kind of groups represented by formulae I to III; a kind of b) the polymer; and the like. Examples thereof may include, but are not limited to, bases such as triethylamine, diisopropylethylamine, pyridine and the like; and acids such as para-toluene sulfonic acid, $BF_3$, $ZnCl_2$, $AlCl_3$ and the like.

For example, in the step v) or v'), a) a polyrotaxane and b) a polymer can be bound to each other by photo-irradiation. The method can be used in a case where, for example, "a polyrotaxane having a cyclic molecule having groups represented by formulae I to III" has a photoreactive group in the cyclic molecule.

The "photoreactive group" is not particularly restricted as long as it is a group that can react and bond each other by irradiation of UV-rays and/or visible rays. For example, the photoreactive group may be, but is not limited to, an unsaturated bond group or a photosensitive group. More specific examples of the "photoreactive group" may include an unsaturated bond group such as an acryloyl group, a 2-acryloyloxyethyl carbamoyl group, a methacryloyl group, a 2-methacryloyloxyethyl carbamoyl group, a 3-methacryloyloxy-2-hydroxypropyl group, a 2-(2-methacryloyloxyethyloxy) ethylcarbamoyl group, a vinyl ether group, a styryl group or an olefinyl group such as a derivative thereof; and a photosensitive group typical in a cinnamoyl group, a cinnamilidene group, a chalkone residue, a coumarin residue, a stilbene residue, a styrylpyridinium residue, a thymine residue, an α-phenylmaleimide residue, an anthracene residue, and a 2-pyrone residue. Preferably, the photoreactive group may be an acryloyl group, a 2-acryloyloxyethyl carbamoyl group, a methacryloyl group, and a 2-methacryloyloxyethyl carbamoyl group and more preferably a 2-acryloyloxyethyl carbamoyl group and a 2-methacryloyloxyethyl carbamoyl group.

Furthermore, in a case where crosslinking reaction is initiated by photo-irradiation, the reaction initiator may be at least one selected from the group consisting of quinones, aromatic ketones, benzoin, benzoin ethers, biimidazole compounds and derivatives thereof, N-phenylglycines, combinations of thioxanthones and alkylaminobenzoic acid, combinations of biimidazole compounds and derivatives thereof and Michler's ketones, acridines, and oxime esters. Specifically, the reaction initiator may be, but is not limited to, quinones such as 2-ethylanthraquinone, octaethylanthraquinone, 1,2-benzanthraquinone, 2,3-benzanthraquinone, 2-phenylanthraquinone, 2,3-diphenylanthraquinone, 1-chloroanthraquinone, 1,4-naphthoquinone, 9,10-phenanthraquinone, 2-methyl-1,4-naphthoquinone, 2,3-dimethylanthraquinone, 3-chloro-2-methylanthraquinone and the like; aromatic ketones such as benzophenone, Michler's ketone[4,4'-bis(dimethylamino)benzophenone], 4,4'-bis(diethylamino)benzophenone and the like; benzoin ethers such as benzoin, benzomethyl ether, benzoinphenyl ether, methylbenzoin, ethylbenzoin and the like; biimidazole compounds and derivatives thereof such as benzyldimethyl ketal, benzyldiethyl ketal, triarylimidazolyl dimers and the like; N-phenylglycines such as N-phenylglycine, N-methyl-N-phenylglycine, N-ethyl-N-phenylglycine and the like; combinations of thioxanthones and alkylamine benzoic acid such as a combination of ethylthioxanthone and ethyl dimethylaminobenzoate, a combination of 2-chlorothioxanthone and ethyl dimethylaminobenzoate, a combination of isopropylthioxanthone and ethyl dimethylbenzoate, and the like; combinations of biimidazole compounds such as triarylimidazolyl dimers and derivatives thereof and Michler's ketone; acridines such as 9-phenylacridine and the like; and oxime esters such as 1-phenyl-1,2-propanedione-2-o-benzoineoxime, 1-phenyl-1,2-propanedione-2-(o-ethoxycarbonyl)oxime and the like. Preferably, the reaction initiator may be thioxanthones such as diethylthioxanthone, chlorothioxanthone and the like; dialkylaminobenzoate esters such as ethyl dimethylaminobenzoate and the like; benzophenone, 4,4'-bis(dimethylamino)benzophenone, 4,4'-bis(diethylamino)benzophenone; biimidazole compounds such as triarylimidazolyl dimers and derivatives thereof; 9-phenylacridine, N-phenylglycines; and combinations thereof. Furthermore, the biimidazole compounds such as triarylimidazolyl dimers and derivatives thereof may include, but are not limited to, for example, 2-(o-chlorophenyl)-4,5-diphenylimidazolyl dimers, 2,2',5-tris-(o-chlorophenyl)-4-(3,4-dimethoxyphenyl)-4',5'-diphenylimidazolyl dimers, 2,4-bis-(o-chlorophenyl)-5-(3,4-dimethoxyphenyl)-diphenylimidazolyl dimers, 2,4,5-tris-(o-chlorophenyl)-diphenylimidazolyl dimers, 2-(o-chlorophenyl)-bis-4,5-(3,4-dimethoxyphenyl)-imidazolyl dimers, 2,2'-bis-(2-fluorophenyl)-4,4',5,5'-tetrakis-(3-methoxyphenyl)-imidazolyl dimers, 2,2'-bis-(2,3-difluoromethylphenyl)-4,4',5,5'-tetrakis-(3-methoxyphenyl)-imidazolyl dimers, 2,2'-bis-(2,4-difluorophenyl)-4,4',5,5'-tetrakis-(3-methoxy phenyl)-imidazolyl dimers, 2,2'-bis-(2,5-difluorophenyl)-4,4',5,5'-tetrakis-(3-methoxy phenyl)-imidazolyl dimers, 2,2'-bis-(2,6-difluorophenyl)-4,4',5,5'-tetrakis-(3-methoxy phenyl)-imidazolyl dimers, 2,2'-bis-(2,3,4-trifluorophenyl)-4,4',5,5'-tetrakis-(3-meth oxyphenyl)-imidazolyl dimers, 2,2'-bis-(2,3,5-trifluorophenyl)-4,4',5,5'-tetrakis-(3-meth oxyphenyl)-imidazolyl dimers, 2,2'-bis-(2,3,6-trifluorophenyl)-4,4',5,5'-tetrakis-(3-meth oxyphenyl)-imidazolyl dimers, 2,2'-bis-(2,4,5-trifluorophenyl)-4,4',5,5'-tetrakis-(3-meth oxyphenyl)-imidazolyl dimers, 2,2'-bis-(2,4,6-trifluorophenyl)-4,4',5,5'-tetrakis-(3-meth oxyphenyl)-imidazolyl dimers, 2,2'-bis-(2,3,4,5-tetrafluorophenyl)-4,4',5,5'-tetrakis-(3-methoxyphenyl)-imidazolyl dimers, 2,2'-bis-(2,3,4,6-tetrafluorophenyl)-4,4',5,5'-tetrakis-(3-methoxyphenyl)-imidazolyl dimers, 2,2'-bis-(2,3,4,5,6-pentafluorophenyl)-4,4',5,5'-tetrakis-(3-methoxyphenyl)-imidazolyl dimers, and the like.

EXAMPLES

The present invention will be illustrated more specifically by way of following Examples, but is not limited thereby.

Example 1

Preparation of a Hydroxypropylated Polyrotaxane

A compound (hereinafter, abbreviating hydroxypropylated polyrotaxane as "HAPR35") obtained by hydroxypropylating a polyrotaxane formed of a linear molecule: polyethylene glycol (average molecular weight: 35,000), a cyclic molecule: α-CD, and a capping group: an adamantane amine group was prepared in a manner similar to the method described in WO2005-080469 (whole contents thereof are incorporated herein by reference) (α-CD inclusion amount: 25%; weight-average molecular weight determined by GPC: 150,000).
<Preparation of Polyrotaxane Having Graft Chain by Ring-Opening Polymerization of ε-Caprolactone, and —COONH($CH_2CH_3$)$_3$ Modification of the Polyrotaxane>

1.0 g of dried HAPR35 was placed in a three-necked flask, and while nitrogen was slowly flowed in, 4.5 g of ε-caprolactone was introduced therein. The mixture was uniformly stirred at 80(C for 30 minutes using a mechanical stirrer, and then the reaction temperature was raised to 100(C. 0.16 g of tin 2-ethylhexanoate (50 wt % solution) which had been diluted in advance with toluene, was added to the flask, the reaction was continued for 4 hours, and then the temperature was lowered to 50(C.

Subsequently, 20 ml of dehydrated toluene was added, and 0.40 g of succinic anhydride (20 mol % based on the entire amount of the hydroxyl groups of the polyrotaxane) was added thereto. The mixture was stirred at 50(C for 24 hours. The pH after the reaction was 4 to 5.

About 95% of toluene, which was the reaction solvent, was removed in an evaporator, and then the residue was neutralized with 0.55 ml of triethylamine, confirming that the pH was 7 to 8. The polyrotaxane obtained after neutralization was analyzed with IR, and a peak originating from an ester at 1736 $cm^{-1}$ as well as peaks originating from an ionized carboxyl group at 1496 $cm^{-1}$ and 1600 $cm^{-1}$ were observed. More, GPC determined that the weight average molecular weight, Mw, was 586,800, and the molecular weight distribution, Mw/Mn, was 1.7.

Thereby, a polyrotaxane having —OH as the moiety A and polycaprolactone (based on an increase in the molecular weight from the raw material HAPR35, the average value of n1 in the formula IV is 2.2) as the moiety M of the group -M-A; the aforementioned polycaprolactone as the moiety M and a residue having COONH($CH_2CH_3$)$_3$ as the moiety B of the group -M-B (more specifically, a group in which —OCO($CH_2$)$_2$COONH($CH_2CH_3$)$_3$ is bonded to M); and a —OH group and a —OCH$_2$CH(CH$_3$)OH group as the moiety C, was obtained.

Example 2

A polyrotaxane was obtained in a manner similar to Example 1, except that the amount of succinic anhydride used in Example 1 was changed to 1.0 g (50 mol % based on the entire amount of the hydroxyl groups of the polyrotaxane).

The polyrotaxane obtained after neutralization was analyzed with IR, and a peak originating from an ester at 1736 $cm^{-1}$ as well as peaks originating from an ionized carboxyl group at 1496 $cm^{-1}$ and 1600 $cm^{-1}$ were observed. More, GPC determined that the weight average molecular weight, Mw, was 580,000, and the molecular weight distribution, Mw/Mn, was 1.7.

Thereby, a polyrotaxane having —OH as the moiety A and polycaprolactone as the moiety M of the group -M-A; the aforementioned polycaprolactone as the moiety M and a residue having COONH($CH_2CH_3$)$_3$ as the moiety B of the group -M-B (more specifically, a group in which —OCO($CH_2$)$_2$COONH($CH_2CH_3$)$_3$ is bonded to M); and a —OH group and a —OCH$_2$CH(CH$_3$)OH group as the moiety C, was obtained, in a manner similar to Example 1.

Example 3

A polyrotaxane was obtained in a manner similar to Example 1, except that the amount of succinic anhydride used in Example 1 was changed to 1.6 g (80 mol % based on the entire amount of the hydroxyl groups of the polyrotaxane).

GPC determined that the weight average molecular weight, Mw, was 796,000, and the molecular weight distribution, Mw/Mn, was 1.2.

Thereby, a polyrotaxane having —OH as the moiety A and polycaprolactone as the moiety M of the group -M-A; the aforementioned polycaprolactone as the moiety M and a residue having COONH($CH_2CH_3$)$_3$ as the moiety B of the group -M-B (more specifically, a group in which —OCO($CH_2$)$_2$COONH($CH_2CH_3$)$_3$ is bonded to M); and a —OH group and a —OCH$_2$CH(CH$_3$)OH group as the moiety C, was obtained in a manner similar to Example 1.

Example 4

Modification of Polyrotaxane Having Graft Chain Using Trimellitic Acid, and —COONH($CH_2CH_3$)$_3$ Modification of the Polyrotaxane 20 g of a compound (HAPR-g-PCL) obtained by subjecting HAPR35 to ring-opening graft polymerization with ε-caprolactone was weighed in a flask, and 125 ml of dehydrated acetone was added to dissolve the compound. Subsequently, 2.8 g of trimellitic anhydride (40 mol % based on the entire amount of the hydroxyl groups of the polyrotaxane) was added to the solution, and the mixture was stirred for 24 hours at 40° C. About 85% of acetone, the reaction solvent, was removed in an evaporator, and then the residue was neutralized with 4.1 ml of triethylamine, thereby to obtain a polyrotaxane having an OH group as the moiety A and polycaprolactone as the moiety M of the group -M-A; the aforementioned polycaprolactone as the moiety M and a residue having $COONH(CH_2CH_3)_3$ as the moiety B of the group -M-B (more specifically, a group in which —$OCO(C_6H_3)$ [$COONH(CH_2CH_3)_3$]$_2$ (here, $C_6H_3$ is a 1,2,4-substituted benzene) is bonded to M); and a —OH group and a —$OCH_2CH(CH_3)OH$ group as the moiety C. GPC determined that the weight average molecular weight, Mw, was 751,000, and the molecular weight distribution, Mw/Mn, was 1.3.

Example 5

Modification Using Acetic Anhydride (Acetylation) and Trimellitic Anhydride 2.5 g of HAPR-g-PCL was weighed in a flask, and 15 ml of dehydrated acetone was added thereto to dissolve the compound. To this solution, 0.05 g of acetic anhydride (10 mol % based on the entire amount of the hydroxyl groups of the polyrotaxane), a catalytic amount of DMAP, and 0.06 ml of triethylamine were added, and the mixture was reacted for 20 hours at room temperature. Subsequently, 0.7 g of trimellitic anhydride (80 mol % based on the entire amount of the hydroxyl groups of the polyrotaxane) was added, and the mixture was stirred for 24 hours at 40° C. About 85% of acetone, the reaction solvent, was removed in an evaporator, and then the residue was neutralized with triethylamine, thereby to obtain a polyrotaxane having an OH group or an acetyl group as the moiety A and polycaprolactone as the moiety M of the group -M-A; the aforementioned polycaprolactone as the moiety M and a residue having $COONH(CH_2CH_3)_3$ as the moiety B of the group -M-B (more specifically, a group in which —$OCO(C_6H_3)$ [$COONH(CH_2CH_3)_3$]$_2$ (here, $C_6H_3$ is a 1,2,4-substituted benzene) is bonded to M); and a —OH group and a —$OCH_2CH(CH_3)$ OH group as the moiety C. GPC determined that the weight average molecular weight, Mw, was 751,000, and the molecular weight distribution, Mw/Mn, was 1.3.

Example 6

Modification Using α-Methacryloyloxy-γ-Butyrolactone and Succinic Anhydride 2.5 g of HAPR-g-PCL was weighed in a flask, and 15 ml of dehydrated toluene was added thereto to dissolve the compound. To this solution, 1000 ppm of 2,6-di-tert-butyl-p-cresol (BHT), and 0.15 g of α-methacryloyloxy-γ-butyrolactone (10 mol % based on the entire amount of the hydroxyl groups of the polyrotaxane) were added, and the mixture was reacted for 2 hours at 100° C. Subsequently, 0.06 ml of triethylamine and 0.27 g of succinic anhydride (60 mol % based on the entire amount of the hydroxyl groups of the polyrotaxane) were added thereto, and the mixture was stirred for 24 hours at 40° C. Thereafter, about 85% of toluene, the reaction solvent, was removed in an evaporator, and then the residue was neutralized with triethylamine, thereby to obtain a polyrotaxane having an OH group or a —OCOCH ($CH_2CH_2OH$)$OCOC(CH_3)$=$CH_2$ group as the moiety A and polycaprolactone as the moiety M of the group -M-A; the aforementioned polycaprolactone as the moiety M and a residue having $COONH(CH_2CH_3)_3$ as the moiety B of the group -M-B (more specifically, a group in which —$OCO(C_6H_3)$ [$COONH(CH_2CH_3)_3$]$_2$ (here, $C_6H_3$ is a 1,2,4-substituted benzene) is bonded to M); and a —OH group and a —$OCH_2CH(CH_3)$ OH group as the moiety C. GPC determined that the weight average molecular weight, Mw, was 751,000, and the molecular weight distribution, Mw/Mn, was 1.3.

Example 7

1.0 g of dried HAPR35 was placed in a three-necked flask, and while nitrogen was slowly flowed in, 4.5 g of ε-caprolactone was introduced therein. The mixture was uniformly stirred at 80° C. for 30 minutes using a mechanical stirrer, and then the reaction temperature was raised to 100° C. 0.16 g of tin 2-ethylhexanoate (50 wt % solution) which had been diluted in advance with toluene, was added to the flask, the reaction was continued for 4 hours, and then the temperature was lowered to 50° C.

Subsequently, 20 ml of dehydrated toluene was added, and 225 μl of butyl isocyanate (10 mol % based on the entire amount of the hydroxyl groups of the polyrotaxane) was added thereto. The mixture was allowed to react for one hour at room temperature. Subsequently, 0.40 g (20 mol % based on the same) of succinic anhydride was added thereto, and the mixture was stirred at 50° C. for 24 hours. Toluene, the reaction solvent, was removed in an evaporator, and then the residue was neutralized with 0.55 ml of triethylamine, confirming that the pH was 7 to 8. The polyrotaxane obtained after neutralization was analyzed with IR, and a peak originating from an ester at 1736 cm$^{-1}$ as well as peaks originating from an ionized carboxyl group and an amide group at 1490 cm$^{-1}$ and 1600 cm$^{-1}$ were observed. More, GPC determined that the weight average molecular weight, Mw, was 628,000, and the molecular weight distribution, Mw/Mn, was 1.9.

Thereby, a polyrotaxane having polycaprolactone (based on an increase in the molecular weight from the raw material HAPR35, the average value of n1 in the formula IV is 2.5) as the moiety M and a —OH group and a —$OCONHCH_2CH_2CH_2CH_3$ group as the moiety A of the group -M-A; polycaprolactone as the moiety M and a residue having $COONH(CH_2CH_3)_3$ as the moiety B of the group -M-B (more specifically, a group in which —OCO ($CH_2$)$_2COONH(CH_2CH_3)_3$ is bonded to M); and a —OH group and a —$OCH_2CH$ ($CH_3$) OH group as the moiety C, was obtained.

Example 8

1.0 g of dried HAPR35 was placed in a three-necked flask, and while nitrogen was slowly flowed in, 4.5 g of ε-caprolactone was introduced therein. The mixture was uniformly stirred at 80° C. for 30 minutes using a mechanical stirrer, and then the reaction temperature was raised to 100° C. 0.16 g of tin 2-ethylhexanoate (50 wt % solution) which had been diluted in advance with toluene, was added to the flask, the reaction was continued for 4 hours, and then the temperature was lowered to 50° C.

Subsequently, 20 ml of dehydrated toluene was added, and 167 μl of acetic acid (20 mol % based on the entire amount of the hydroxyl groups of the polyrotaxane) was added thereto.

The mixture was subjected to esterification under heating. Subsequently, 0.40 g (20 mol % based on the same) of succinic anhydride was added thereto, and the mixture was stirred at 50° C. for 24 hours. Toluene, the reaction solvent, was removed in an evaporator, and then the residue was neutralized with 0.55 ml of triethylamine, confirming that the pH was 7 to 8. The polyrotaxane obtained after neutralization was analyzed with IR, and a peak originating from an ester at 1735 cm$^{-1}$ as well as peaks originating from CH$_3$—(C=O) at 1350 cm$^{-1}$ and 1460 cm$^{-1}$ were observed. More, GPC determined that the weight average molecular weight, Mw, was 442,000, and the molecular weight distribution, Mw/Mn, was 1.8.

Thereby, a polyrotaxane having polycaprolactone as the moiety M and a —OH group and a —OCOCH$_3$ group as the moiety A of the group -M-A; polycaprolactone as the moiety M and a —O—COCH$_2$CH$_2$—COONH(CH$_2$CH$_3$)$_3$ group as the moiety B of the group -M-B; and a —OH group and a —OCH$_2$CH(CH$_3$)OH group as the moiety C, was obtained.

Example 9

Preparation of Acetylated Polyrotaxane

A adamantane polyrotaxane (hereinafter, abbreviating adamantane polyrotaxane as "APR35") formed of a linear molecule: PEG (average molecular weight: 35,000), a cyclic molecule: α-CD, and a capping group: an adamantane amine group was prepared in a manner similar to the method described in WO2005-052026 (whole contents thereof are incorporated herein by reference) (α-CD inclusion amount: 27%; weight average molecular weight determined by GPC: 100,000).

<Preparation of Polyrotaxane Having Graft Chain by Ring-Opening Polymerization of ε-Caprolactone, and —COONH(CH$_2$CH$_3$)$_3$ Modification of the Polyrotaxane In a three-necked flask, 10 g of APR35 was dissolved in 200 ml of a 4% lithium chloride solution in dehydrated dimethylformamide. 1.7 g of 4-dimethylaminopyridien was dissolved in the resulting solution, and then 4.3 ml of triethylamine and 2.6 ml of acetic anhydride (20 mol % based on the hydroxyl groups of APR) were sequentially added to the solution. The mixture was allowed to react for 5 hours at room temperature.

The reaction solution was dialyzed for 48 hours under a stream of tap water using a dialysis tube (molecular weight cut-off 12,000). Further, the dialysis was performed two times for 3 hours in purified water. After filtering (Kiriyama 5A) the dialysate, freeze-drying was carried out, thereby to obtain 9.1 g of a product obtained by substituting a part of the —OH groups of α-CD with acetyl groups (this is a product obtained by introducing acetyl groups into APR, and hereinafter, the "product obtained by introducing acetyl groups into APR 35" may be generally abbreviated to "E2APR35"). The introduction ratio of acetyl groups was calculated from the integral ratio of —CH$_3$ of the acetyl group at 2 ppm and the proton in APR35 at 3 to 6.2 ppm of $^1$NMR, and found to be 17% (proportion based on the entire amount of the hydroxyl groups of the polyrotaxane). GPC determined that the weight average molecular weight, Mw, was 115,000, and the molecular weight distribution, Mw/Mn, was 1.4.

A polyrotaxane was synthesized in a manner similar to Example 1, except that 1.0 g of HAPR35 used in Example 1 was changed to 1.0 g of E2APR35. The polyrotaxane obtained after neutralization was analyzed with IR, and a peak originating from an ester at 1736 cm$^{-1}$ as well as peaks originating from an ionic carboxyl group at 1496 cm$^{-1}$ and 1600 cm$^{-1}$ were observed. More, GPC determined that the weight average molecular weight, Mw, was 456,000, and the molecular weight distribution, Mw/Mn, was 1.9.

Thereby, a polyrotaxane having polycaprolactone as the moiety M and a —OH group as the moiety A of the group -M-A; polycaprolactone as the moiety M and a —O—COCH$_2$CH$_2$—COONH(CH$_2$CH$_3$)$_3$ group as the moiety B of the group -M-B; and a —OH group and a —O—COCH$_3$ group as the moiety C, was obtained.

Example 10

A polyrotaxane was obtained in a manner similar to Example 1, except that 4.5 g of ε-caprolactone used in Example 1 was changed to a mixture of 4.3 g of ε-caprolactone and 0.2 g of α-methyl-γ-butyrolactone. GPC determined that the weight average molecular weight, Mw, was 510,000, and the molecular weight distribution, Mw/Mn, was 1.7.

Thereby, a polyrotaxane having a polymer produced from a monomer mixture of ε-caprolactone and α-methyl-γ-butyrolactone as the moiety M of the groups -M-A and -M-B; a —OH group as the moiety A; a residue having COONH(CH$_2$CH$_3$)$_3$ as the moiety B (more specifically, a group in which —OCO(CH$_2$)$_2$COONH(CH$_2$CH$_3$)$_3$ is bonded to M); and a —OH group and a —OCH$_2$CH(CH$_3$)OH group as the moiety C, was obtained.

Example 11

A polyrotaxane was obtained in a manner similar to Example 1, except that 4.5 g of ε-caprolactone of Example 1 was changed to a mixture of 3.6 g of ε-caprolactone and 0.9 g of γ-butyrolactone. GPC determined that the weight average molecular weight, Mw, was 520,000, and the molecular weight distribution, Mw/Mn, was 1.6.

Thereby, a polyrotaxane having a polymer produced from a monomer mixture of ε-caprolactone and γ-butyrolactone as the moiety M of the groups -M-A and -M-B; a —OH group as the moiety A; a residue having COONH(CH$_2$CH$_3$)$_3$ as the moiety B (more specifically, a group in which —OCO(CH$_2$)$_2$COONH(CH$_2$CH$_3$)$_3$ is bonded to M); and a —OH group and a —OCH$_2$CH(CH$_3$)OH group as the moiety C, was obtained.

Example 12

A polyrotaxane was obtained in a manner similar to Example 1, except that 4.5 g of (-caprolactone of Example 1 was changed to a mixture of 4.3 g of (-caprolactone and 0.2 g of (-butyrolactone. GPC determined that the weight average molecular weight, Mw, was 500,000, and the molecular weight distribution, Mw/Mn, was 1.6.

Thereby, a polyrotaxane having a polymer produced from a monomer mixture of (-caprolactone and (-butyrolactone as the moiety M of the groups -M-A and -M-B; a —OH group as the moiety A; a residue having COONH(CH2CH3)3 as the moiety B (more specifically, a group in which —OCO(CH2)2COONH(CH2CH3)3 is bonded to M); and a —OH group and a —OCH2CH(CH3)OH group as the moiety C, was obtained.

Example 13

An emulsion was synthesized in a manner similar to Example 1, except that 4.5 g of (-caprolactone of Example 1 was changed to a mixture of 4.3 g of (-caprolactone and 0.2 g of γ-valerolactone. GPC determined that the weight average molecular weight, Mw, was 525,000, and the molecular weight distribution, Mw/Mn, was 1.6.

Thereby, a polyrotaxane having a polymer produced from a monomer mixture of ε-caprolactone and γ-valerolactone as the moiety M of the groups -M-A and -M-B; a —OH group as the moiety A; a residue having COONH($CH_2CH_3$)$_3$ as the moiety B (more specifically, a group in which —OCO($CH_2$)$_2$COONH($CH_2CH_3$)$_3$ is bonded to M); and a —OH group and a —OCH$_2$CH(CH$_3$)OH group as the moiety C, was obtained.

Example 14

A polyrotaxane was obtained in a manner similar to Example 1, except that 4.5 g of ε-caprolactone of Example 1 was changed to a mixture of 3.6 g of ε-caprolactone and 0.9 g of L-lactide. GPC determined that the weight average molecular weight, Mw, was 612,000, and the molecular weight distribution, Mw/Mn, was 1.7.

Thereby, a polyrotaxane having a polymer produced from a monomer mixture of ε-caprolactone and L-lactide as the moiety M of the groups -M-A and -M-B; a —OH group as the moiety A; a residue having COONH($CH_2CH_3$)$_3$ as the moiety B (more specifically, a group in which —OCO($CH_2$)$_2$COONH($CH_2CH_3$)$_3$ is bonded to M); and a —OH group and a —OCH$_2$CH(CH$_3$)OH group as the moiety C, was obtained.

According to $^1$NMR, the molar ratio of random polymerization of L-lactide/ε-caprolactone was calculated from the proton ratio of —CH— of the L-lactide polymer (5 to 5.2 ppm) and —CH$_2$—O—C— of the ε-caprolactone polymer (4 ppm), and found to be 19/81.

Example 15

A polyrotaxane was obtained in a manner similar to Example 1, except that 4.5 g of ε-caprolactone of Example 1 was changed to a mixture of 4.05 g of ε-caprolactone and 0.45 g of 1,5-dioxepan-2-one. GPC determined that the weight average molecular weight, Mw, was 654,000, and the molecular weight distribution, Mw/Mn, was 1.9.

Thereby, a polyrotaxane having a polymer produced from a monomer mixture of ε-caprolactone and 1,5-dioxepan-2-one as the moiety M of the groups -M-A and -M-B; a —OH group as the moiety A; a residue having COONH($CH_2CH_3$)$_3$ as the moiety B (more specifically, a group in which —OCO($CH_2$)$_2$COONH($CH_2CH_3$)$_3$ is bonded to M); and a —OH group and a —OCH$_2$CH(CH$_3$)OH group as the moiety C, was obtained.

According to $^1$NMR, the molar ratio of random polymerization of 1,5-dioxepan-2-one/ε-caprolactone was calculated from the proton ratio of —O—CO—CH$_2$— of the 1,5-dioxepan-2-one polymer (2.6 ppm) and —O—CO—CH$_2$— of the ε-caprolactone polymer (2.3 ppm), and found to be 1/9.

Example 16

300 µl of polyoxyethylene (8) octyl phenyl ether (manufactured by Wako Pure Chemical Industries, Ltd.) was added as a surfactant to the polyrotaxane prepared in Example 1, and the mixture was thoroughly stirred. The mixture was added dropwise in small amounts to 28 ml of ion-exchanged water kept warm at 50° C., and the mixture was vigorously stirred. Stirring was continued for one hour at 50° C. even after completion of the addition, thereby to obtain an emulsion in which the polyrotaxane was dispersed in water. The emulsion was stable even after 10 days, and no precipitate was observed.

Example 17

An emulsion was synthesized in a manner similar to Example 16, except that the surfactant used in Example 16 was changed to 300 mg of sodium dodecyl sulfate (manufactured by Wako Pure Chemical Industries, Ltd.), and the stirring temperature used during the emulsification process was changed to room temperature.

Example 18

An emulsion was synthesized in a manner similar to Example 17, except that the polyrotaxane prepared in Example 3 was used instead of the polyrotaxane prepared in Example 1.

Example 19

An emulsion was synthesized in a manner similar to Example 18, except that the polyrotaxane prepared in Example 4 was used instead of the polyrotaxane prepared in Example 3.

Example 20

An emulsion was synthesized in a manner similar to Example 18, except that the polyrotaxane prepared in Example 5 was used instead of the polyrotaxane prepared in Example 3.

Example 21

An emulsion was synthesized in a manner similar to Example 17, except that the polyrotaxane prepared in Example 6 was used instead of the polyrotaxane prepared in Example 1.

Example 22

The polyrotaxane prepared in Example 7 was subjected to the same treatment as that used in Example 16, thereby to obtain an emulsion in which the polyrotaxane was dispersed in water.

Example 23

An emulsion was synthesized in a manner similar to Example 22, except that the surfactant used in Example 22 was changed to 300 mg of sodium dodecyl sulfate (manufactured by Wako Pure Chemical Industries, Ltd.), and the stirring temperature used during the emulsification process was changed to room temperature.

Example 24

Preparation of Crosslinked Body

A 1-ml aliquot of the emulsion obtained in Example 16 was taken, and 13 mg of adipic acid dihydrazide (an amount to achieve a ratio of —COONH($CH_2CH_3$)$_3$ and —NH$_2$ of 1:1) as a crosslinking agent was added to the aliquot. The mixture was stirred. The solution was applied on a glass plate, air-dried, and then dried for one hour each at 60° C. and 120° C., thereby to obtain a coating film which was a crosslinked body. The resulting coating film was scraped off, confirming that the coating film did not dissolve in alkaline water, toluene and dimethyl sulfoxide.

Example 25

Preparation of Crosslinked Body

A crosslinked body was obtained in a manner similar to Example 24, by using the emulsion obtained in Example 22. The resulting coating film was scraped off, confirming that the coating film did not dissolve in alkaline water, toluene and dimethyl sulfoxide.

Example 26

Preparation of Crosslinked Body

A 1 ml aliquot of the emulsion obtained in Example 18 was taken, and 143 μl of Carbodilite (registered trademark, manufactured by Nisshinbo Holdings, Inc.) V-02 (an amount to achieve a ratio of —COONH($CH_2CH_3$)$_3$ and —N=C=N of 2:1) as a crosslinking agent was added to the aliquot. The solution was poured into a mold and was dried at room temperature, to obtain a crosslinked body. The resulting crosslinked body was immersed in tetrahydrofuran (THF) for 3 days, confirming that even after stirring was carried out for one hour, the crosslinked body did not dissolve in THF, and that crosslinking was maintained.

Example 27

Preparation of Crosslinked Body

A crosslinked body was obtained in a manner similar to Example 26, except that the crosslinking agent used in Example 26 was changed to 80 μl of Carbodilite (registered trademark, manufactured by Nisshinbo Holdings, Inc.) V-04. The resulting crosslinked body was immersed in THF for 3 days, confirming that even after stirring was carried out for one hour, the crosslinked body did not dissolve in THF, and that crosslinking was maintained.

Example 28

Preparation of Crosslinked Body 5 g of poly(vinyl acetate-co-crotonic acid) (manufactured by Sigma-Aldrich Company, vinyl acetate:crotonic acid=90: 10) was neutralized with 1 ml of triethylamine (TEA), and the resultant was dissolved in 19 ml of ion-exchanged water to produce a 20 wt % solution. To 0.5 ml of the solution, 1.25 ml of the emulsion obtained in Example 18 (an amount to achieve a ratio of COOH [mmol/g] of 1:1) was added, and 183 μl of Carbodilite (registered trademark, manufactured by Nisshinbo Holdings, Inc.) V-04 (an amount to achieve a ratio of —COONH($CH_2CH_3$)$_3$ and —N=C=N of 2:1) was added thereto.

The solution was poured into a mold and was dried at room temperature, to obtain a crosslinked body. The resulting crosslinked body was immersed in THF for 3 days, confirming that even after stirring was carried out for one hour, the crosslinked body did not dissolve in THF, and that crosslinking was maintained.

Example 29

Preparation of Crosslinked Body 0.5 mg of Irgacure 2959 (manufactured by Ciba Specialty Chemicals Corp.) was added to 0.3 ml of the emulsion obtained in Example 21, and the mixture was irradiated with ultraviolet radiation at 30 mW/cm$^2$ for 60 seconds, confirming gelation of the film, that is, preparation of a crosslinked body.

Example 30

Preparation of Crosslinked Body 0.2 ml of a solution of the polyrotaxane obtained after neutralization in Example 1 was dissolved in 0.2 ml of toluene, and hexamethylene diisocyanate was used as a crosslinking agent and added to the solution at a ratio of isocyanate: OH=1:1. The solution was poured into a mold and was crosslinked at 60° C. Gelation was confirmed after 2.5 hours, and the product was peeled off from the mold. Subsequently, the solvent was dried, thereby to obtain a crosslinked body.

Example 31

A crosslinked body of polyrotaxane was obtained in a manner similar to Example 30, except that the polyrotaxane was changed to the polyrotaxane obtained in Example 7.

Example 32

A crosslinked body of polyrotaxane was obtained in a manner similar to Example 30, except that the polyrotaxane was changed to the polyrotaxane obtained in Example 8.

BRIEF DESCRIPTION OF THE DRAWINGS

FIG. 1 is a schematic diagram illustrating "a polyrotaxane having a cyclic molecule having groups represented by formulae I to III" according to the present invention.

What is claimed is:

1. A polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), wherein the cyclic molecule comprises a group represented by following formula I, a group represented by following formula II, and a group represented by following formula III:

-M-A                                            Formula I;

-M-B                                   Formula II; and

—C                                         Formula III;

wherein M represents a structure represented by following formula IV or V, wherein Q represents a linear alkylene or alkenylene group having 1 to 8 carbon atoms, a branched alkylene or alkenylene group having 3 to 20 carbon atoms, an alkylene group obtained by substituting a part of the alkylene or alkenylene group with an —O— bond or an —NH— bond, or an alkylene group obtained by substituting a part of the hydrogen atoms of the alkylene group with at least one selected from the group consisting of a hydroxyl group, a carboxyl group, an acyl group, a phenyl group, a halogen atom and an olefin group; and each of n1 and n2 independently represents 1 to 200;

A represents —OX$^1$ or —NX$^2$X$^3$, wherein each of X$^1$, X$^2$ and X$^3$ independently represents a group selected from the group consisting of a hydrogen atom and groups represented by following formulae X-1 to X-7, wherein each of $R_1$, $R_2$, $R_4$ and $R_5$ independently represents a linear alkyl group having 1 to 12 carbon atoms, or a branched or alicyclic alkyl group having 3 to 12 carbon atoms; each of $R_{6a}$, $R_{6b}$ and $R_{6c}$ independently represents a hydrogen atom, a linear alkyl group having 1 to 12 carbon atoms, or a branched alkyl group having 3 to 12 carbon atoms (at least one of $R_{6a}$ to $R_{6c}$ is an alkyl group); $R_3$ represents a substituent obtained by removing three hydrogen atoms from a linear alkyl group having 1 to 12 carbon atoms or a branched alkyl group having 3 to 12 carbon atoms; at least one of $Y_1$ to $Y_3$ represents a group selected from the group consisting of a hydroxyl group, an $NH_2$ group and an SH group, while the rest of $Y_1$ to $Y_3$ are hydrogen atoms; and $R_7$ represents a photoreactive group;

B represents a residue having a group selected from the group consisting of $-(OCH_2CH_2)_{m1}OH$ wherein m1 represents 1 to 200, $-(NHCH_2CH_2)_{m2}NH_2$ wherein m2 represents 1 to 200, $-COOX^4$, $-SO_3X^5$, $-PO_4X^6$, and a pyridine ring derivative group represented by formula VI-1 or formula VI-2, wherein symbol * represents that the site where the pyridine ring is bonded may be any of 2- to 6-position; and in the formula VI-2, $X^{7-}$ represents an ion species selected from the group consisting of $Cl^-$, $Br^-$ and $I^-$; and C represents a group represented by the moiety A and/or moiety B described above:

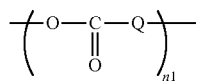

IV

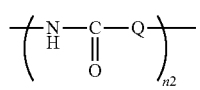

V

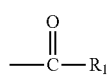

X-1

$-R_2$

X-2

X-3

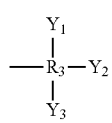

X-4

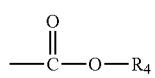

X-5

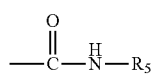

X-6

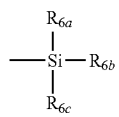

X-7

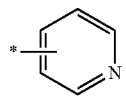

VI-1

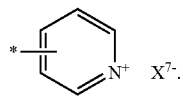

VI-2

2. The polyrotaxane according to claim 1, wherein $X^1$, or $X^2$ and $X^3$ in A is a hydrogen atom.

3. The polyrotaxane according to claim 1, wherein A is $-OX^1$, and B is a residue having $-COOX^4$.

4. The polyrotaxane according to claim 1, wherein M has a structure represented by the formula IV and is derived from ring-opening polymerization of a lactone monomer.

5. The polyrotaxane according to claim 1, wherein M has a structure represented by the formula V and is derived from ring-opening polymerization of a lactam monomer.

6. An aqueous polyrotaxane dispersion composition comprising the polyrotaxane according to claim 1; and a water, wherein said polyrotaxane is dispersed in the water.

7. The composition according to claim 6, wherein B is selected from the group consisting of $-COOX^4$, $-SO_3X^5$, $-PO_4X^6$, and a pyridine ring derivative group represented by the formula VI-2; each of $X^4$ to $X^6$ is independently selected from Li, Na, K, $NR_8R_9R_{10}R_{11}$, wherein each of $R_8$ to $R_{11}$ is independently selected from the group consisting of a hydrogen atom, a linear alkyl group having 1 to 12 carbon atoms and a branched alkyl group having 3 to 12 carbon atoms, and a pyridinium base.

8. The composition according to claim 6, wherein the content of the polyrotaxane is 5 to 95 wt %, in 100 wt % of the composition.

9. A material comprising the polyrotaxane according to claim 1.

10. A material comprising:
a) the polyrotaxane according to claim 1; and
b) a polymer;
wherein said a) polyrotaxane and said b) polymer are bound to each other through a covalent bond and/or an ionic bond.

11. The material according to claim 10, wherein b) said polymer is c) a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s).

12. The material according to claim 10, wherein b) the polymer may be d) the polyrotaxane according to claim 1.

13. A material comprising:
a) the polyrotaxane according to claim 1; and/or
e) the material according to claim 10.

14. A method for producing a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s),
wherein the cyclic molecule comprises a group represented by following formula I, a group represented by following formula II, and a group represented by following formula III:

-M-A    Formula I;

-M-B    Formula II; and

—C    Formula III;

the method comprising the steps of:
i) preparing the polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s); and
ii) introducing said groups represented by said formulae I to III:
wherein M represents a structure represented by following formula IV or V, wherein Q represents a linear alkylene or alkenylene group having 1 to 8 carbon atoms, a branched alkylene or alkenylene group having 3 to 20 carbon atoms, an alkylene group obtained by substituting a part of the alkylene or alkenylene group with an —O— bond or an —NH— bond, or an alkylene group obtained by substituting a part of the hydrogen atoms of the alkylene group with at least one selected from the group consisting of a hydroxyl group, a carboxyl group, an acyl group, a phenyl group, a halogen atom and an olefin group; and each of n1 and n2 independently represents 1 to 200;
A represents —$OX^1$ or —$NX^2X^3$, wherein each of $X^1$, $X^2$ and $X^3$ independently represents a group selected from the group consisting of a hydrogen atom and groups represented by following formulae X-1 to X-7, wherein each of $R_1$, $R_2$, $R_4$ and $R_5$ independently represents a linear alkyl group having 1 to 12 carbon atoms, or a branched or alicyclic alkyl group having 3 to 12 carbon atoms; each of $R_{6a}$, $R_{6b}$ and $R_{6c}$ independently represents a hydrogen atom, a linear alkyl group having 1 to 12 carbon atoms, or a branched alkyl group having 3 to 12 carbon atoms (at least one of $R_{6a}$ to $R_{6c}$ is an alkyl group); $R_3$ represents a substituent obtained by removing three hydrogen atoms from a linear alkyl group having 1 to 12 carbon atoms or a branched alkyl group having 3 to 12 carbon atoms; at least one of $Y_1$ to $Y_3$ represents a group selected from the group consisting of a hydroxyl group, an $NH_2$ group and an SH group, while the rest of $Y_1$ to $Y_3$ are hydrogen atoms; and $R_7$ represents a photoreactive group;
B represents a residue having a group selected from the group consisting of —$(OCH_2CH_2)_{m1}OH$ wherein m1 represents 1 to 200, —$(NHCH_2CH_2)_{m2}NH_2$ wherein m2 represents 1 to 200, —$COOX^4$, —$SO_3X^5$, —$PO_4X^6$, and a pyridine ring derivative group represented by formula VI-1 or formula VI-2, wherein symbol * represents that the site where the pyridine ring is bonded may be any of 2- to 6-position; and in the formula VI-2, $X^{7-}$ represents an ion species selected from the group consisting of $Cl^-$, $Br^-$ and $I^-$; and
C represents a group represented by the moiety A and/or moiety B described above:

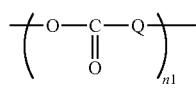

IV

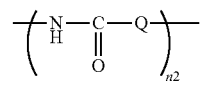

V

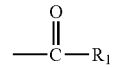

X-1

X-2

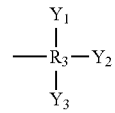

X-3

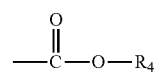

X-4

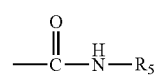

X-5

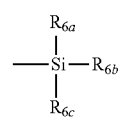

X-6

X-7

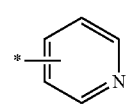

VI-1

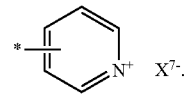

VI-2

15. A method for producing an aqueous dispersion composition comprising a polyrotaxane; and a water; wherein the polyrotaxane is dispersed in the water,
wherein the polyrotaxane comprises a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s); and
wherein the cyclic molecule comprises a group represented by following formula I, a group represented by following formula II, and a group represented by following formula III:

-M-A    Formula I;

-M-B    Formula II; and

—C    Formula III;

the method comprising the steps of:
i) preparing the polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s);

ii) introducing said groups represented by said formulae I to III; and iii) dispersing said polyrotaxane obtained in the step ii) in the water:

wherein M represents a structure represented by following formula IV or V, wherein Q represents a linear alkylene or alkenylene group having 1 to 8 carbon atoms, a branched alkylene or alkenylene group having 3 to 20 carbon atoms, an alkylene group obtained by substituting a part of the alkylene or alkenylene group with an —O— bond or an —NH— bond, or an alkylene group obtained by substituting a part of the hydrogen atoms of the alkylene group with at least one selected from the group consisting of a hydroxyl group, a carboxyl group, an acyl group, a phenyl group, a halogen atom and an olefin group; and each of n1 and n2 independently represents 1 to 200;

A represents —$OX^1$ or —$NX^2X^3$, wherein each of $X^1$, $X^2$ and $X^3$ independently represents a group selected from the group consisting of a hydrogen atom and groups represented by following formulae X-1 to X-7, wherein each of $R_1$, $R_2$, $R_4$ and $R_5$ independently represents a linear alkyl group having 1 to 12 carbon atoms, or a branched or alicyclic alkyl group having 3 to 12 carbon atoms; each of $R_{6a}$, $R_{6b}$ and $R_{6c}$ independently represents a hydrogen atom, a linear alkyl group having 1 to 12 carbon atoms, or a branched alkyl group having 3 to 12 carbon atoms (at least one of $R_{6a}$ to $R_{6c}$ is an alkyl group); $R_3$ represents a substituent obtained by removing three hydrogen atoms from a linear alkyl group having 1 to 12 carbon atoms or a branched alkyl group having 3 to 12 carbon atoms; at least one of $Y_1$ to $Y_3$ represents a group selected from the group consisting of a hydroxyl group, an $NH_2$ group and an SH group, while the rest of $Y_1$ to $Y_3$ are hydrogen atoms; and $R_7$ represents a photoreactive group;

B represents a residue having a group selected from the group consisting of —$(OCH_2CH_2)_{m1}OH$ wherein m1 represents 1 to 200, —$(NHCH_2CH_2)_{m2}NH_2$ wherein m2 represents 1 to 200, —$COOX^4$, —$SO_3X^5$, —$PO_4X^6$, and a pyridine ring derivative group represented by formula VI-1 or formula VI-2, wherein symbol * represents that the site where the pyridine ring is bonded may be any of 2- to 6-position; and in the formula VI-2, $X^{7-}$ represents an ion species selected from the group consisting of $Cl^-$, $Br^-$ and $I^-$; and C represents a group represented by the moiety A and/or moiety B described above:

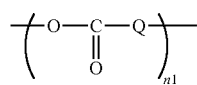    IV

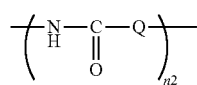    V

    X-1

    X-2

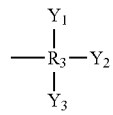    X-3

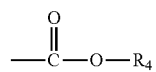    X-4

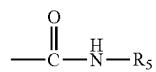    X-5

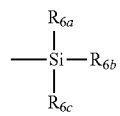    X-6

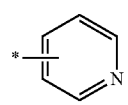    X-7

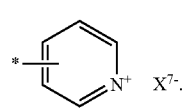    VI-1

VI-2

16. A method for producing a material comprising
a) a polyrotaxane; and
b) a polymer;
wherein a) the polyrotaxane and b) the polymer are bound to each other via a covalent bond and/or an ionic bond,
the polyrotaxane comprises a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s); and
the cyclic molecule comprises a group represented by following formula I, a group represented by following formula II, and a group represented by following formula III:

-M-A    Formula I;

-M-B    Formula II; and

—C    Formula III;

the method comprising the steps of:
i) preparing the polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s);
ii) introducing said groups represented by said formulae I to III;
iii) dispersing said polyrotaxane obtained in the step ii) in the water, to obtain an aqueous polyrotaxane dispersion composition;
iv) depending on b) said polymer, optionally adding b) said polymer into said dispersion composition obtained in the step iii); and v) bonding a) said polyrotaxane and b) said polymer via a covalent bond and/or an ionic bond, in said dispersion composition obtained in the step iii) or iv):

wherein M represents a structure represented by following formula IV or V, wherein Q represents a linear alkylene or alkenylene group having 1 to 8 carbon atoms, a branched alkylene or alkenylene group having 3 to 20 carbon atoms, an alkylene group obtained by substituting a part of the alkylene or alkenylene group with an —O— bond or an —NH— bond, or an alkylene group obtained by substituting a part of the hydrogen atoms of the alkylene group with at least one selected from the group consisting of a hydroxyl group, a carboxyl group, an acyl group, a phenyl group, a halogen atom and an olefin group; and each of n1 and n2 independently represents 1 to 200;

A represents —$OX^1$ or —$NX^2X^3$, wherein each of $X^1$, $X^2$ and $X^3$ independently represents a group selected from the group consisting of a hydrogen atom and groups represented by following formulae X-1 to X-7, wherein each of $R_1$, $R_2$, $R_4$ and $R_5$ independently represents a linear alkyl group having 1 to 12 carbon atoms, or a branched or alicyclic alkyl group having 3 to 12 carbon atoms; each of $R_{6a}$, $R_{6b}$ and $R_{6c}$ independently represents a hydrogen atom, a linear alkyl group having 1 to 12 carbon atoms, or a branched alkyl group having 3 to 12 carbon atoms (at least one of $R_{6a}$ to $R_{6c}$ is an alkyl group); $R_3$ represents a substituent obtained by removing three hydrogen atoms from a linear alkyl group having 1 to 12 carbon atoms or a branched alkyl group having 3 to 12 carbon atoms; at least one of $Y_1$ to $Y_3$ represents a group selected from the group consisting of a hydroxyl group, an $NH_2$ group and an SH group, while the rest of $Y_1$ to $Y_3$ are hydrogen atoms; and $R_7$ represents a photoreactive group;

B represents a residue having a group selected from the group consisting of —$(OCH_2CH_2)_{m1}OH$ wherein m1 represents 1 to 200, —$(NHCH_2CH_2)_{m2}NH_2$ wherein m2 represents 1 to 200, —$COOX^4$, —$SO_3X^5$, —$PO_4X^6$, and a pyridine ring derivative group represented by formula VI-1 or formula VI-2, wherein symbol * represents that the site where the pyridine ring is bonded may be any of 2- to 6-position; and in the formula VI-2, $X^{7-}$ represents an ion species selected from the group consisting of $Cl^-$, $Br^-$ and $I^-$; and C represents a group represented by the moiety A and/or moiety B described above:

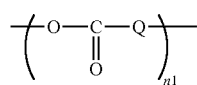  IV

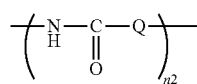  V

  X-1

  X-2

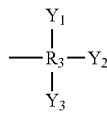  X-3

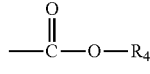  X-4

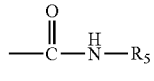  X-5

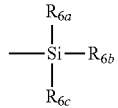  X-6

  X-7

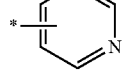  VI-1

VI-2

17. A method for producing a material comprising
a) a polyrotaxane; and
b) a polymer;
wherein a) the polyrotaxane and b) the polymer are bound to each other via a covalent bond and/or an ionic bond,
the polyrotaxane comprises a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s); and
the cyclic molecule comprises a group represented by following formula I, a group represented by following formula II, and a group represented by following formula III:

-M-A    Formula I;

-M-B    Formula II; and

—C    Formula III;

the method comprising the steps of:
i) preparing the polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s);
ii) introducing said groups represented by said formulae I to III;
iii) dissolving said polyrotaxane obtained in the step ii) in a solvent, to obtain a polyrotaxane solution;
iv) depending on b) said polymer, optionally adding b) said polymer into said polyrotaxane solution; and v') bonding a) said polyrotaxane and b) said polymer via a covalent bond and/or an ionic bond, in said solution obtained in the step iii) or iv):

wherein M represents a structure represented by following formula IV or V, wherein Q represents a linear alkylene or alkenylene group having 1 to 8 carbon atoms, a branched alkylene or alkenylene group having 3 to 20 carbon atoms, an alkylene group obtained by substituting a part of the alkylene or alkenylene group with an —O— bond or an —NH— bond, or an alkylene group obtained by substituting a part of the hydrogen atoms of the alkylene group with at least one selected from the group consisting of a hydroxyl group, a carboxyl group, an acyl group, a phenyl group, a halogen atom and an olefin group; and each of n1 and n2 independently represents 1 to 200;

A represents —$OX^1$ or —$NX^2X^3$, wherein each of $X^1$, $X^2$ and $X^3$ independently represents a group selected from the group consisting of a hydrogen atom and groups represented by following formulae X-1 to X-7, wherein each of $R_1$, $R_2$, $R_4$ and $R_5$ independently represents a linear alkyl group having 1 to 12 carbon atoms, or a branched or alicyclic alkyl group having 3 to 12 carbon atoms; each of $R_{6a}$, $R_{6b}$ and $R_{6c}$ independently represents a hydrogen atom, a linear alkyl group having 1 to 12 carbon atoms, or a branched alkyl group having 3 to 12 carbon atoms (at least one of $R_{6a}$ to $R_{6c}$ is an alkyl group); $R_3$ represents a substituent obtained by removing three hydrogen atoms from a linear alkyl group having 1 to 12 carbon atoms or a branched alkyl group having 3 to 12 carbon atoms; at least one of $Y_1$ to $Y_3$ represents a group selected from the group consisting of a hydroxyl group, an $NH_2$ group and an SH group, while the rest of $Y_1$ to $Y_3$ are hydrogen atoms; and $R_7$ represents a photoreactive group;

B represents a residue having a group selected from the group consisting of —$(OCH_2CH_2)_{m1}OH$ wherein m1 represents 1 to 200, —$(NHCH_2CH_2)_{m2}NH_2$ wherein m2 represents 1 to 200, —$COOX^4$, —$SO_3X^5$, —$PO_4X^6$, and a pyridine ring derivative group represented by formula VI-1 or formula VI-2, wherein symbol * represents that the site where the pyridine ring is bonded may be any of 2- to 6-position; and in the formula VI-2, $X^{7-}$ represents an ion species selected from the group consisting of $Cl^-$, $Br^-$ and $I^-$; and C represents a group represented by the moiety A and/or moiety B described above:

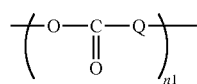

IV

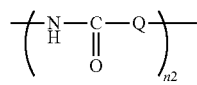

V

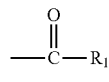

X-1

X-2

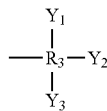

X-3

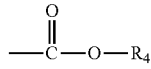

X-4

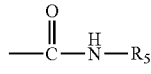

X-5

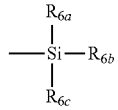

X-6

X-7

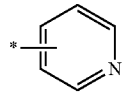

VI-1

VI-2

18. The method according to claim 14,
wherein the step ii) comprises
ii)-1) polymerizing a monomer and bonding a structure represented by said formula IV or V to said cyclic molecule, to introduce said group represented by said formula I; and
ii)-2) bonding said B to a terminal of the structure obtained in the step ii)-1), to introduce said group represented by said formula II.

19. The method according to claim 18 comprising a step of introducing said group represented by said formula III, prior to the step ii)-1).

20. The method according to claim 16 further comprising a step of removing the solvent in a system, after the step v).

21. The method according to claim 16, wherein in the step v), a) said polyrotaxane and b) said polymer are bound to each other by using a crosslinking agent.

22. The method according to claim 16, wherein in the step v), a) said polyrotaxane and b) said polymer are bound to each other by using a catalyst.

23. The method according to claim 16, wherein in the step v), a) said polyrotaxane and b) said polymer are bound to each other by photo-irradiation.

24. The method according to claim 17 further comprising a step of removing the solvent in a system, after the step v').

25. The method according to claim 17, wherein in the step v'), a) said polyrotaxane and b) said polymer are bound to each other by using a crosslinking agent.

26. The method according to claim 17, wherein in the step v'), a) said polyrotaxane and b) said polymer are bound to each other by using a catalyst.

27. The method according to claim 17, wherein in the step v'), a) said polyrotaxane and b) said polymer are bound to each other by photo-irradiation.

* * * * *

UNITED STATES PATENT AND TRADEMARK OFFICE
CERTIFICATE OF CORRECTION

PATENT NO. : 8,580,906 B2  
APPLICATION NO. : 12/995438  
DATED : November 12, 2013  
INVENTOR(S) : Y. Hayashi et al.

Page 1 of 2

It is certified that error appears in the above-identified patent and that said Letters Patent is hereby corrected as shown below:

In the Claims:

| COLUMN | LINE | ERROR |
|---|---|---|
| 33 (Claim 1, | 24 line 52) | after "-PO4X6" insert --[wherein each of X4 to X6 is independently selected from the group consisting of a hydrogen atom, Li, Na, K, NR8R9R10R11 (wherein each of R8 to R11 is independently selected from the group consisting of a hydrogen atom, a linear alkyl group having 1 to 12 carbon atoms, and a branched alkyl group having 3 to 12 carbon atoms), and a pyridinium base]-- |
| 35 (Claim 14, | 52 line 60) | after "-PO4X6" insert --[wherein each of X4 to X6 is independently selected from the group consisting of a hydrogen atom, Li, Na, K, NR8R9R10R11 (wherein each of R8 to R11 is independently selected from the group consisting of a hydrogen atom, a linear alkyl group having 1 to 12 carbon atoms, and a branched alkyl group having 3 to 12 carbon atoms), and a pyridinium base]-- |
| 37 (Claim 15, | 43 line 65) | after "-PO4X6" insert --[wherein each of X4 to X6 is independently selected from the group consisting of a hydrogen atom, Li, Na, K, NR8R9R10R11 (wherein each of R8 to R11 is independently selected from the group consisting of a hydrogen atom, a linear alkyl group having 1 to 12 carbon atoms, and a branched alkyl group having 3 to 12 carbon atoms), and a pyridinium base]-- |

Signed and Sealed this  
Sixteenth Day of September, 2014

Michelle K. Lee  
*Deputy Director of the United States Patent and Trademark Office*

CERTIFICATE OF CORRECTION (continued)
U.S. Pat. No. 8,580,906 B2

| COLUMN | LINE | ERROR |
|---|---|---|
| 39 (Claim 16, | 42 line 74) | after "-PO4X6" insert --[wherein each of X4 to X6 is independently selected from the group consisting of a hydrogen atom, Li, Na, K, NR8R9R10R11 (wherein each of R8 to R11 is independently selected from the group consisting of a hydrogen atom, a linear alkyl group having 1 to 12 carbon atoms, and a branched alkyl group having 3 to 12 carbon atoms), and a pyridinium base]-- |
| 41 (Claim 17, | 40 line 72) | after "-PO4X6" insert --[wherein each of X4 to X6 is independently selected from the group consisting of a hydrogen atom, Li, Na, K, NR8R9R10R11 (wherein each of R8 to R11 is independently selected from the group consisting of a hydrogen atom, a linear alkyl group having 1 to 12 carbon atoms, and a branched alkyl group having 3 to 12 carbon atoms), and a pyridinium base]-- |